(12) United States Patent
Kawamoto et al.

(10) Patent No.: US 11,249,043 B2
(45) Date of Patent: Feb. 15, 2022

(54) CONTROL DEVICE FOR GAS SENSOR

(71) Applicant: DENSO CORPORATION, Kariya (JP)

(72) Inventors: Yusuke Kawamoto, Kariya (JP); Toru Katafuchi, Kariya (JP); Takehito Kimata, Kariya (JP); Ryozo Kayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 779 days.

(21) Appl. No.: 15/388,181

(22) Filed: Dec. 22, 2016

(65) Prior Publication Data

US 2017/0184536 A1   Jun. 29, 2017

(30) Foreign Application Priority Data

Dec. 25, 2015   (JP) .............................. JP2015-252938

(51) Int. Cl.
*G01N 27/406* (2006.01)
*G01N 27/416* (2006.01)
*G01N 27/407* (2006.01)

(52) U.S. Cl.
CPC ..... *G01N 27/4065* (2013.01); *G01N 27/4074* (2013.01); *G01N 27/4075* (2013.01); *G01N 27/4163* (2013.01)

(58) Field of Classification Search
CPC ......... G01N 27/406–409; G01N 27/41; G01N 27/417; G01N 27/419; G01N 27/4175; G01N 27/4163; F91B 11/007; F02D 41/1438–1496; F02D 41/22–222; G01M 15/10–108; Y02T 10/47
See application file for complete search history.

(56) References Cited

U.S. PATENT DOCUMENTS

| | | | |
|---|---|---|---|
| 2003/0121310 A1* | 7/2003 | Tomura | G01N 27/419 73/31.05 |
| 2004/0221641 A1 | 11/2004 | Moritsugu et al. | |
| 2007/0119708 A1 | 5/2007 | Oya et al. | |
| 2009/0242427 A1 | 10/2009 | Muroguchi et al. | |
| 2011/0016949 A1* | 1/2011 | Sasaki | G01N 27/4175 73/23.31 |
| 2012/0131909 A1 | 5/2012 | Maeda | |
| 2014/0238853 A1 | 8/2014 | Yoshida et al. | |

(Continued)

FOREIGN PATENT DOCUMENTS

| | | | |
|---|---|---|---|
| JP | 2003-270194 | | 9/2003 |
| JP | 2003270194 A | * | 9/2003 |
| JP | 2004-138432 | | 5/2004 |

(Continued)

OTHER PUBLICATIONS

EPO Machine Translation of JP-2009175013-A, last retrieved Dec. 9, 2019.*

*Primary Examiner* — Maris R Kessel

(74) *Attorney, Agent, or Firm* — Nixon & Vanderhye P.C.

(57) ABSTRACT

An SCU as a control device for the gas sensor (first and second NOx sensors) includes an applied voltage switching unit for switching an applied voltage of a pump cell when a deterioration detecting function is performed, and a deterioration rate calculation unit for calculating a deterioration rate of a sensor cell based on a slope during a transient change in an output of the sensor cell according to a switching of the applied voltage by the applied voltage switching unit.

20 Claims, 14 Drawing Sheets

(56) References Cited

U.S. PATENT DOCUMENTS

2016/0223488 A1   8/2016   Kayama et al.

FOREIGN PATENT DOCUMENTS

| | | |
|---|---|---|
| JP | 2005-140742 | 6/2005 |
| JP | 2006-267126 | 10/2006 |
| JP | 2006-267127 | 10/2006 |
| JP | 2008-008668 | 1/2008 |
| JP | 2008-121473 | 5/2008 |
| JP | 2009-168617 | 7/2009 |
| JP | 2009-175013 | 8/2009 |
| JP | 2009-175014 | 8/2009 |
| JP | 2009175013 A * | 8/2009 |
| JP | 2011-247612 | 12/2011 |
| JP | 2015059926 A * | 3/2015 |

* cited by examiner

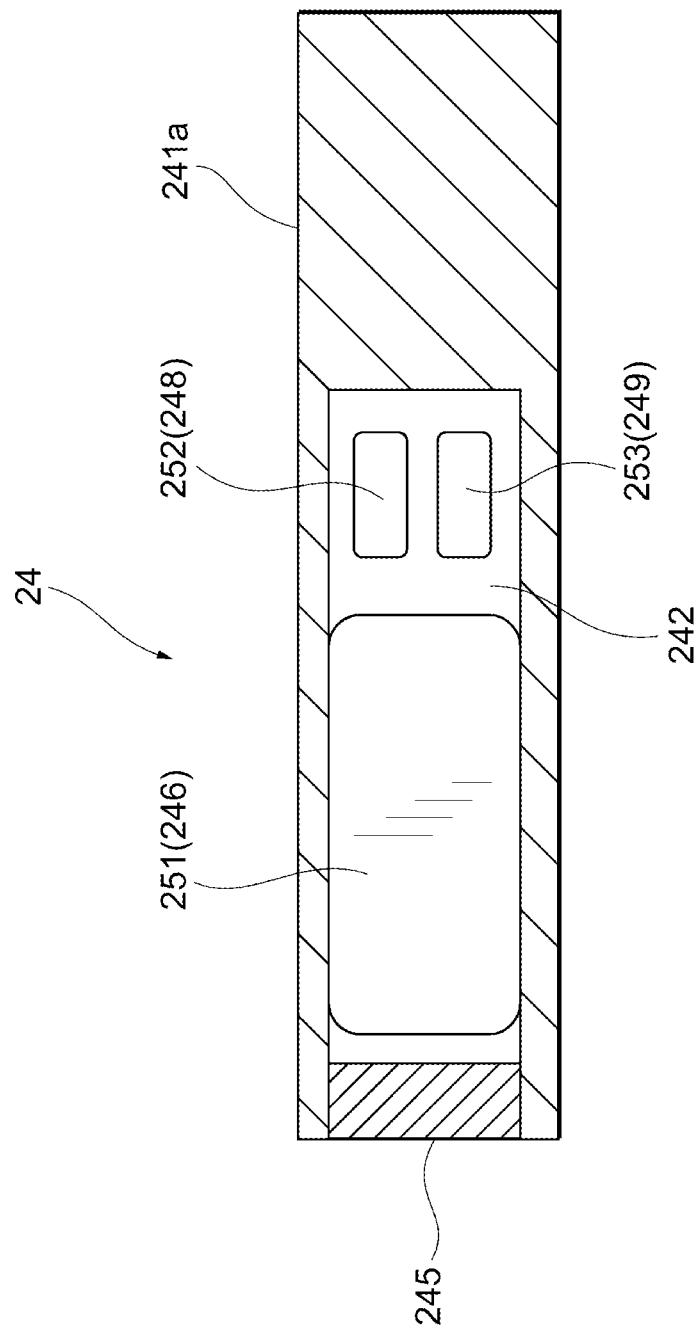

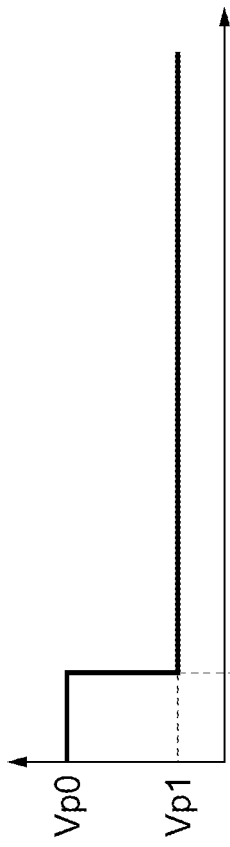
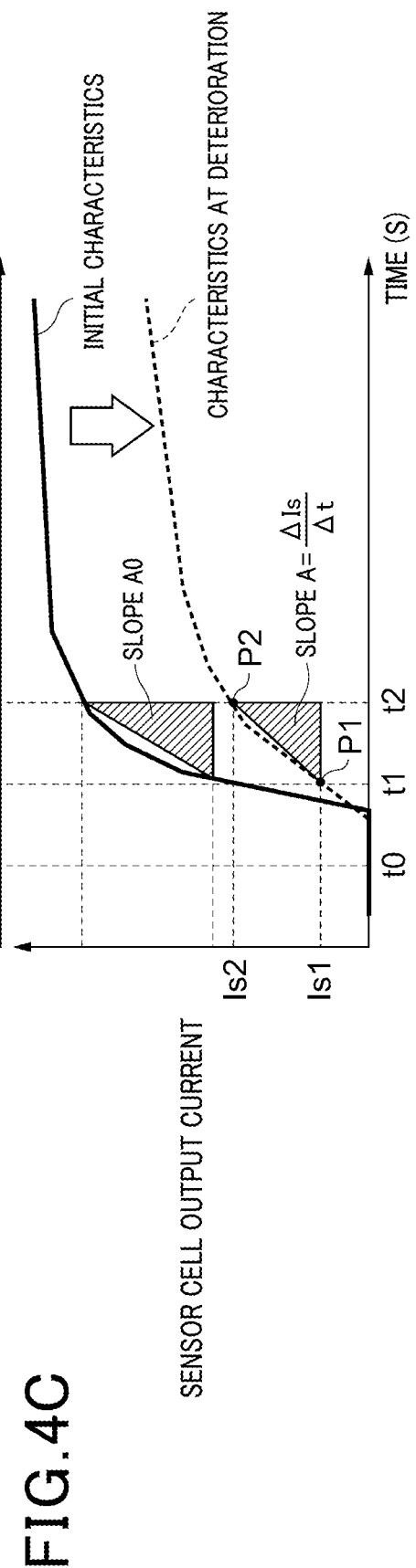
FIG.4A
FIG.4B
FIG.4C

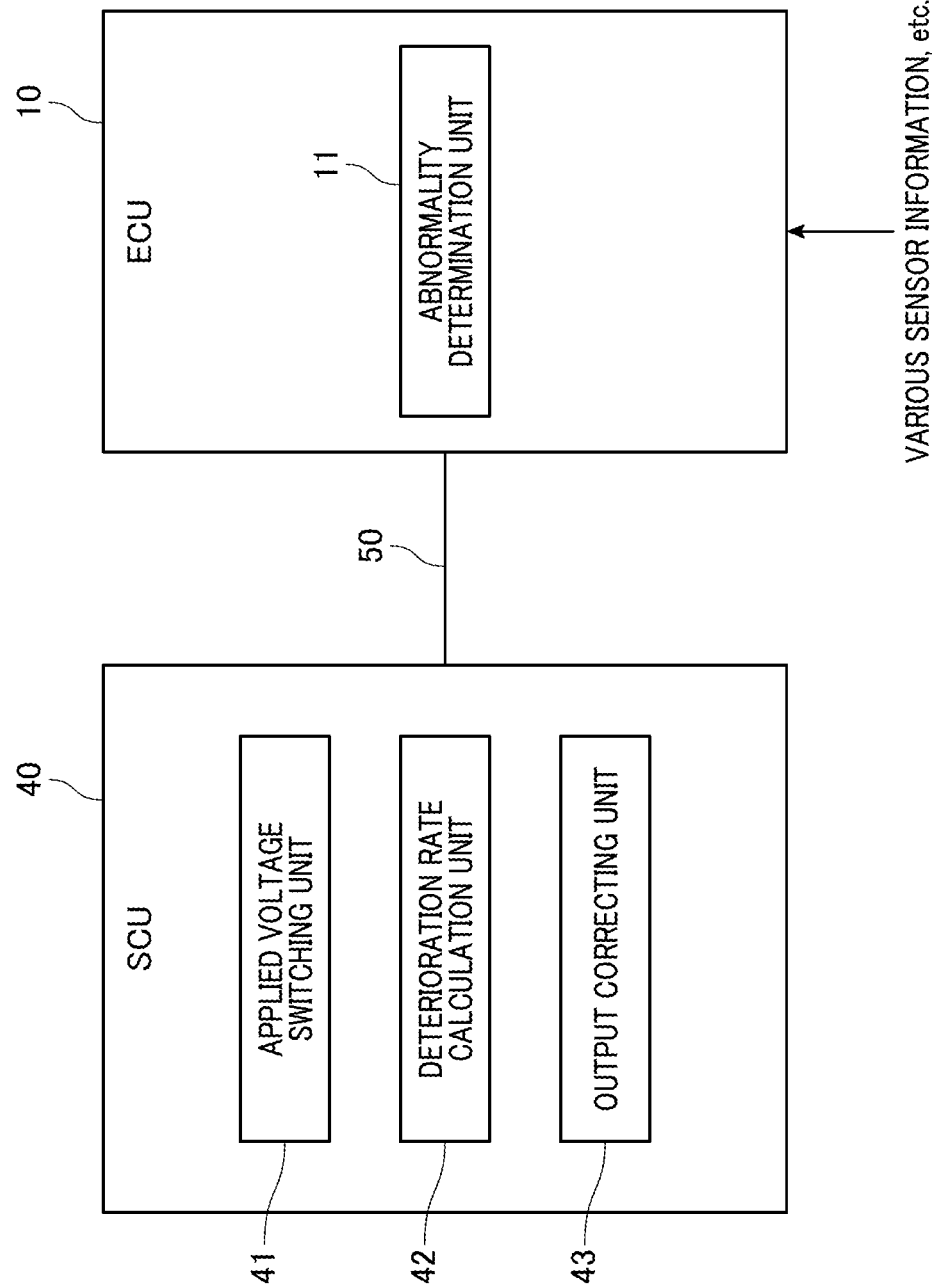

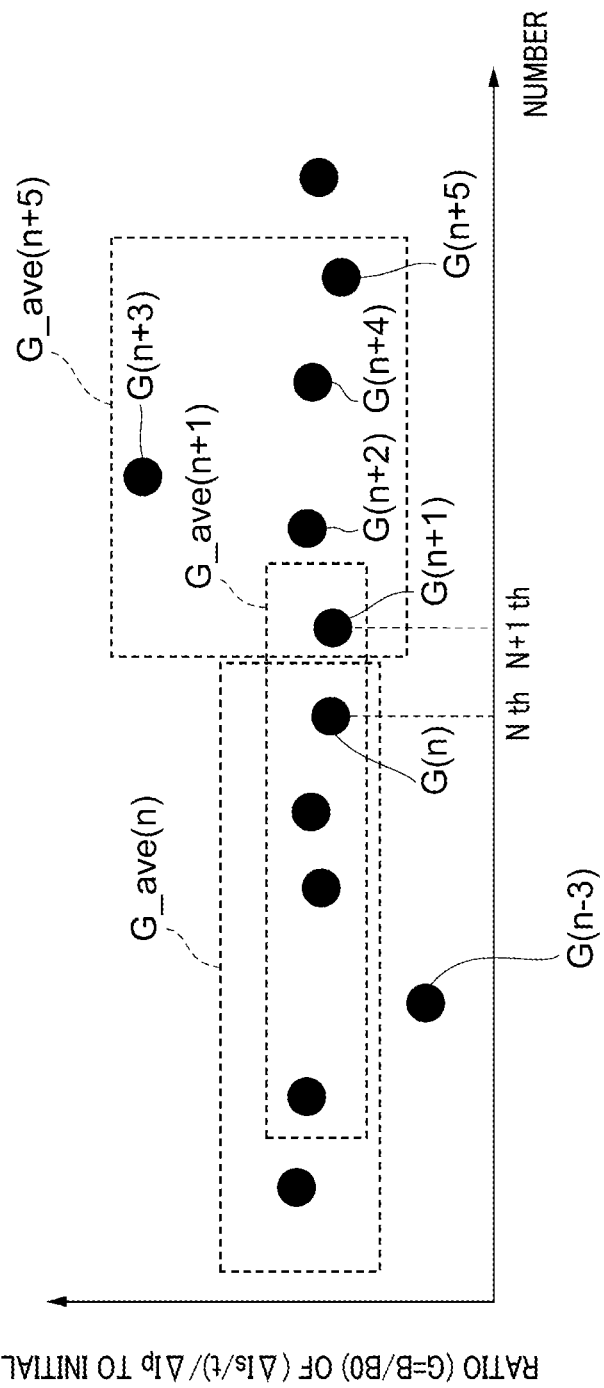

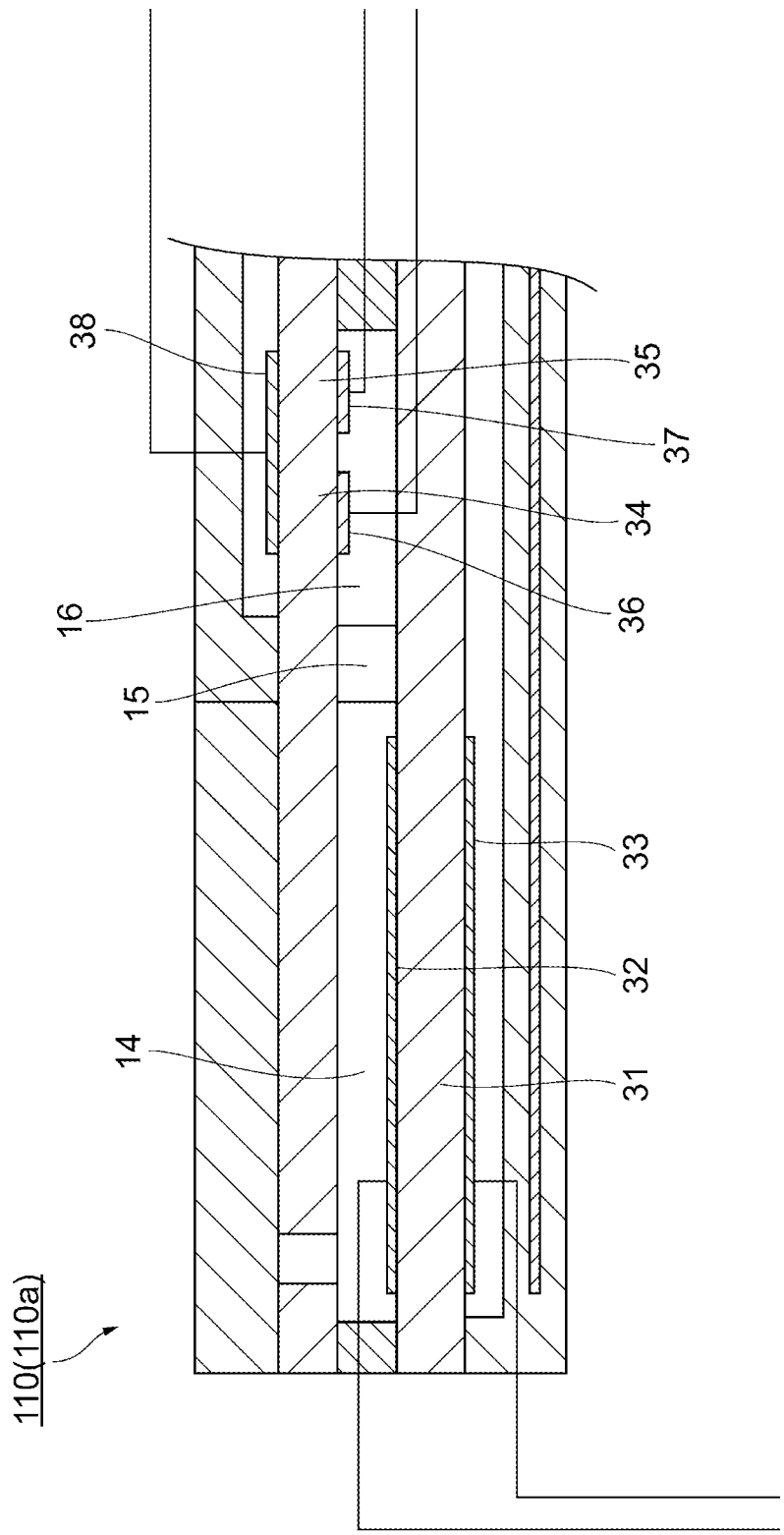

CONTROL DEVICE FOR GAS SENSOR

CROSS-REFERENCE TO RELATED APPLICATION

This application is based on and claims the benefit of priority from earlier Japanese Patent Application No. 2015-252938 filed Dec. 25, 2015, the description of which is incorporated herein by reference.

TECHNICAL FIELD

The present disclosure relates to a control device for a gas sensor.

BACKGROUND

A NOx sensor for detecting the concentration of NOx (nitrogen oxide) is known as a gas sensor for detecting a concentration of a specific gas component in a detected gas such as exhaust gas of an internal combustion engine.

The NOx sensor has a three-cell structure including a pump cell, a monitor cell, and a sensor cell as described in, for example, Japanese Patent Application Laid-Open Publication No. 2009-175013, and oxygen in the exhaust gas introduced into a sensor chamber is discharged or pumped out in the pump cell.

In addition, a residual oxygen concentration in the sensor chamber after passing through the pump cell is detected in the monitor cell, and the NOx concentration is detected from the gas after passing through the pump cell in the sensor cell.

If the NOx sensor deteriorates, no accurate NOx concentration can be detected, and as a result, problems such as deterioration of the exhaust emissions may occur in a case where the NOx sensor is installed in an exhaust system of an automobile.

Therefore, a deterioration diagnosis method of a NOx sensor has been proposed conventionally.

Then, a method of forcibly switching a voltage applied to the pump cell and diagnosing deterioration of the NOx sensor based on a change amount of the sensor cell output at this time is disclosed in, for example, JP Publication No. '013.

However, according to the conventional deterioration diagnosis method described in JP Publication No. '013, the change amount of the sensor cell output is detected after the applied voltage to the pump cell is stepwisely varied.

Therefore, there is room for further improvement from a viewpoint of adequately diagnosing deterioration of the gas sensor, such as it is necessary to wait for diagnosis until a transient response occurring in the sensor cell output converges according to the variation of the applied voltage.

SUMMARY

An embodiment provides a control device for a gas sensor capable of appropriately performing deterioration diagnosis of a sensor output.

In a control device for controlling an operation of a gas sensor according to a first aspect, the control device includes a pump cell for adjusting an oxygen concentration of a detected gas according to an applied voltage, and a sensor cell for detecting a concentration of a specific gas component from the detected gas after the oxygen concentration has been adjusted by the pump cell.

The control device further includes an applied voltage switching unit for switching the applied voltage of the pump cell, and a deterioration rate calculation unit for calculating a deterioration rate of the sensor cell based on a slope during a transient change in an output of the sensor cell according to a change of the applied voltage applied by the applied voltage switching unit.

In the present disclosure, it is possible to ascertain a degree of deterioration based on a change in transient response characteristics by utilizing the slope during the transient change among the transient response characteristics of the sensor cell output according to the switching of the applied voltage of the pump cell, and thus it is possible to accurately calculate the deterioration rate.

Further, since the deterioration rate is obtained based on the slope during the transient change, it can be detected before the transient response stabilizes at a steady value, so that the time required for deterioration determination is short and a deterioration diagnosis can be performed quickly.

According to the present disclosure, it is possible to provide a control device for a gas sensor capable of appropriately performing deterioration diagnosis of a sensor output.

BRIEF DESCRIPTION OF THE DRAWINGS

In the accompanying drawings:

FIG. 3 shows a sectional view taken along a line III-III of FIG. 2;

FIGS. 4A, 4B, and 4C show diagrams for explaining changes in transient characteristics of a sensor cell output due to deterioration of the NOx sensor;

FIG. 5 shows a functional block diagram of an SCU and an ECU according to the present embodiment;

FIG. 13 shows a diagram for explaining the process of calculating a reaction speed ratio by the averaging process in the modification of the embodiment; and FIG. 14 shows a schematic diagram of an example of a configuration of a NOx sensor including a plurality of measurement chambers in the modification of the embodiment.

DETAILED DESCRIPTION OF THE PREFERRED EMBODIMENTS

Figure 1:
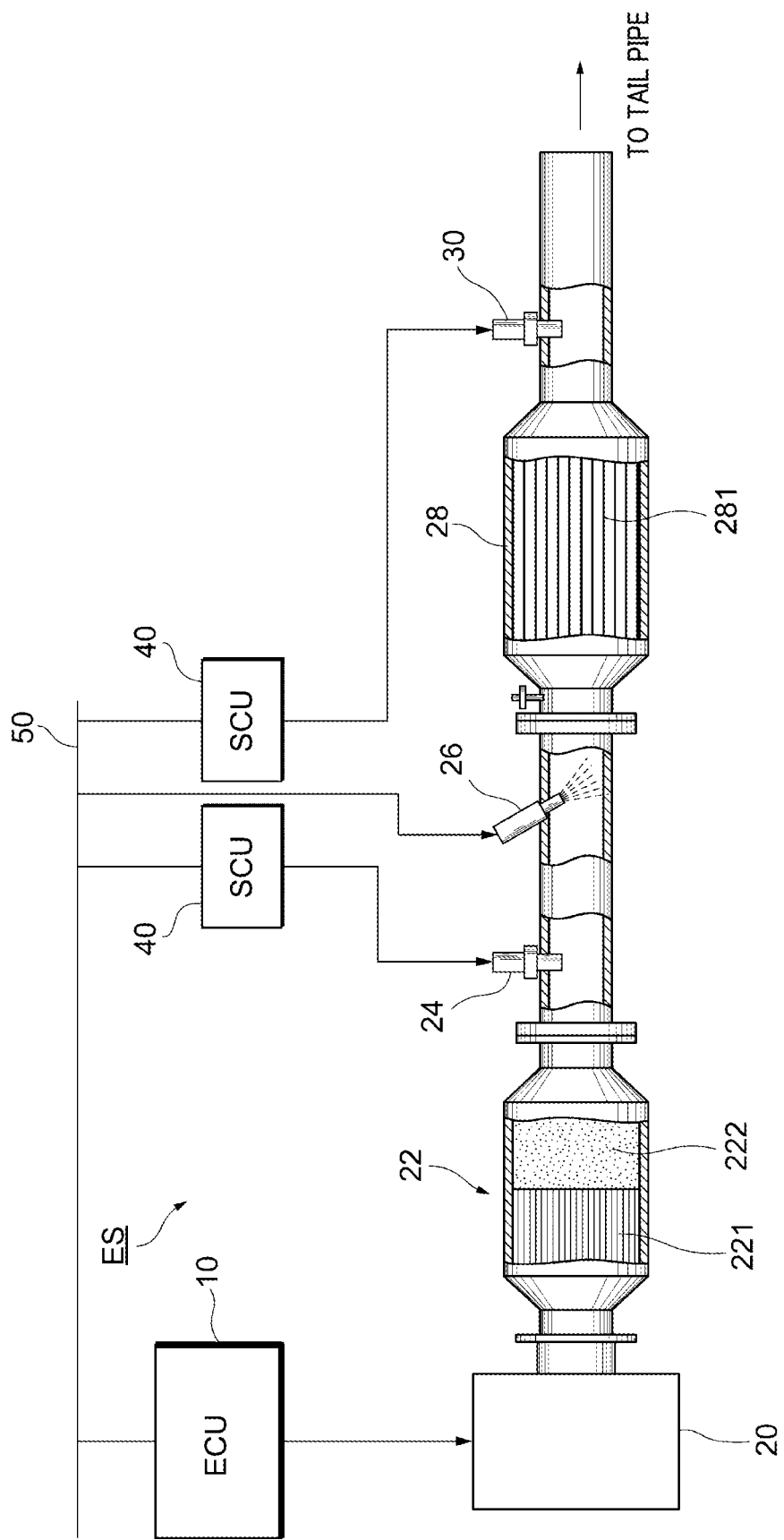
FIG. 1 shows a schematic view of an engine exhaust system to which a control device for a gas sensor according to an embodiment of the present disclosure is applied.

An embodiment of the present disclosure will be described below with reference to the accompanying drawings.

In order to facilitate the understanding of the explanation, the same reference numerals are given to the same constituent elements in each drawing as much as possible and redundant explanations are omitted.

An embodiment of a deterioration diagnosis device for a gas sensor according to the present disclosure will be described with reference to FIGS. 1 to 9.

In the present embodiment, first and second NOx sensors 24, 30 that measure NOx concentration in an exhaust gas are used as examples to explain a gas sensor for detecting the concentration of a specific gas component in the exhaust gas (detected gas) of an internal combustion engine (engine).

As shown in FIG. 1, SCUs (Sensor Control Unit) 40 are provided in an engine exhaust system ES.

Each of the SCUs 40 is connected to an ECU (Engine Control Unit) 10 via a CAN (Controller Area Network) bus 50 and performs information communication with the ECU 10.

The ECU 10 is a device that controls a diesel engine 20 and the engine exhaust system ES connected thereto.

The ECU 10 has a function of controlling a behavior of the diesel engine 20.

The ECU 10 adjusts an opening of a fuel injection valve based on an accelerator opening and an engine speed.

The SCU 40 detects an oxygen ($O_2$) concentration in the exhaust gas of the internal combustion engine flowing through the engine exhaust system ES by using a limit current type first and second NOx sensors 24, 30 and also detects a concentration of NOx (nitrogen oxide) as a concentration of specific gas component.

The engine exhaust system ES is provided with a diesel oxidation catalytic converter 22 and an SCR (Selective Catalytic Reduction) catalytic converter 28 in this order from the diesel engine 20 side.

The diesel oxidation catalytic converter 22 has a diesel oxidation catalyst (DOC) 221 and a diesel particulate filter (DPF) 222.

The diesel oxidation catalytic converter 22 is for purifying harmful substances contained in the exhaust gas by oxidation or reduction, and particularly, it is a device for trapping particulate matter (PM) composed of carbon or the like.

The diesel oxidation catalyst 221 is mainly composed of a ceramic carrier, an oxide mixture containing aluminum oxide, cerium dioxide and zirconium dioxide as components, and a precious metal catalyst such as platinum, palladium, or rhodium.

The diesel oxidation catalyst 221 oxidizes and purifies hydrocarbons, carbon monoxide, nitrogen oxides, and the like contained in the exhaust gas.

In addition, the diesel oxidation catalyst 221 raises the temperature of the exhaust gas by a heat generated during a catalytic reaction.

The diesel particulate filter 222 is formed of a honeycomb structure in which a platinum group catalyst such as platinum or palladium is supported on a porous ceramic.

The diesel particulate filter 222 deposits the particulate matter contained in the exhaust gas on partition walls of the honeycomb structure.

The deposited particulate matter is then oxidized and purified by combustion.

A rise of the temperature in the diesel oxidation catalyst 221 or a decrease in the combustion temperature of the particulate matter due to additives is used for the combustion.

The SCR catalytic converter 28 is a device for reducing NOx to nitrogen and water as a post-treatment device of the diesel oxidation catalytic converter 22, and has an SCR 281 which is a selective reduction type catalyst.

The SCR 281 can be exemplified by a catalyst in which a noble metal such as Pt is supported on a substrate surface such as zeolite or alumina.

The catalyst temperature of the SCR 281 is in the active temperature range, and reduces and purifies NOx when urea as a reducing agent is added.

A urea-adding injector 26 is disposed upstream of the SCR catalytic converter 28 for adding urea.

In the present embodiment, the first NOx sensor 24 is disposed between the diesel oxidation catalytic converter 22 and the urea-adding injector 26, and the second NOx sensor 30 is disposed on the downstream side of the SCR catalytic converter 28.

An amount of urea to be added to the SCR catalytic converter 28 from the urea-adding injector 26 is determined based on the NOx concentration detected by the first NOx sensor 24 and the NOx concentration detected by the second NOx sensor 30.

More specifically, the amount of urea to be added is determined based on the NOx concentration detected from the exhaust gas by the first NOx sensor 24 before passing through the SCR catalytic converter 28.

In addition, the second NOx sensor 30 feeds back such that the NOx concentration detected from the exhaust gas after passing through the SCR catalytic converter 28 becomes as small as possible, and corrects the amount of urea to be added.

The amount of urea determined in this way is added to the SCR 281 from the urea-adding injector 26 so that the NOx in the exhaust gas is appropriately reduced in the SCR 281.

As described above, hydrocarbons, carbon monoxide, and nitrogen oxides contained in the exhaust gas pass through the first NOx sensor 24 and the second NOx sensor 30, and are then discharged to the outside from a tail pipe (not shown).

Currents outputted from the first NOx sensor 24 and the second NOx sensor 30 are detected by the SCUs 40.

The SCU 40 calculates the NOx concentration from the current values detected from the first and second NOx sensors 24, 30, controls the urea-adding injector 26, and transmits necessary data to the ECU 10.

The ECU 10 and the SCUs 40 are connected to a CAN (Controller Area Network) bus 50, and perform information communication via the CAN bus 50.

Each of the SCUs 40 includes a CPU, a RAM, a ROM, input/output ports, and a memory device.

Since the first NOx sensor 24 and the second NOx sensor 30 have the same configuration, the configuration of the first NOx sensor 24 will be described as an example, and the configuration of the SCU 40 will also be described.

Figure 2:
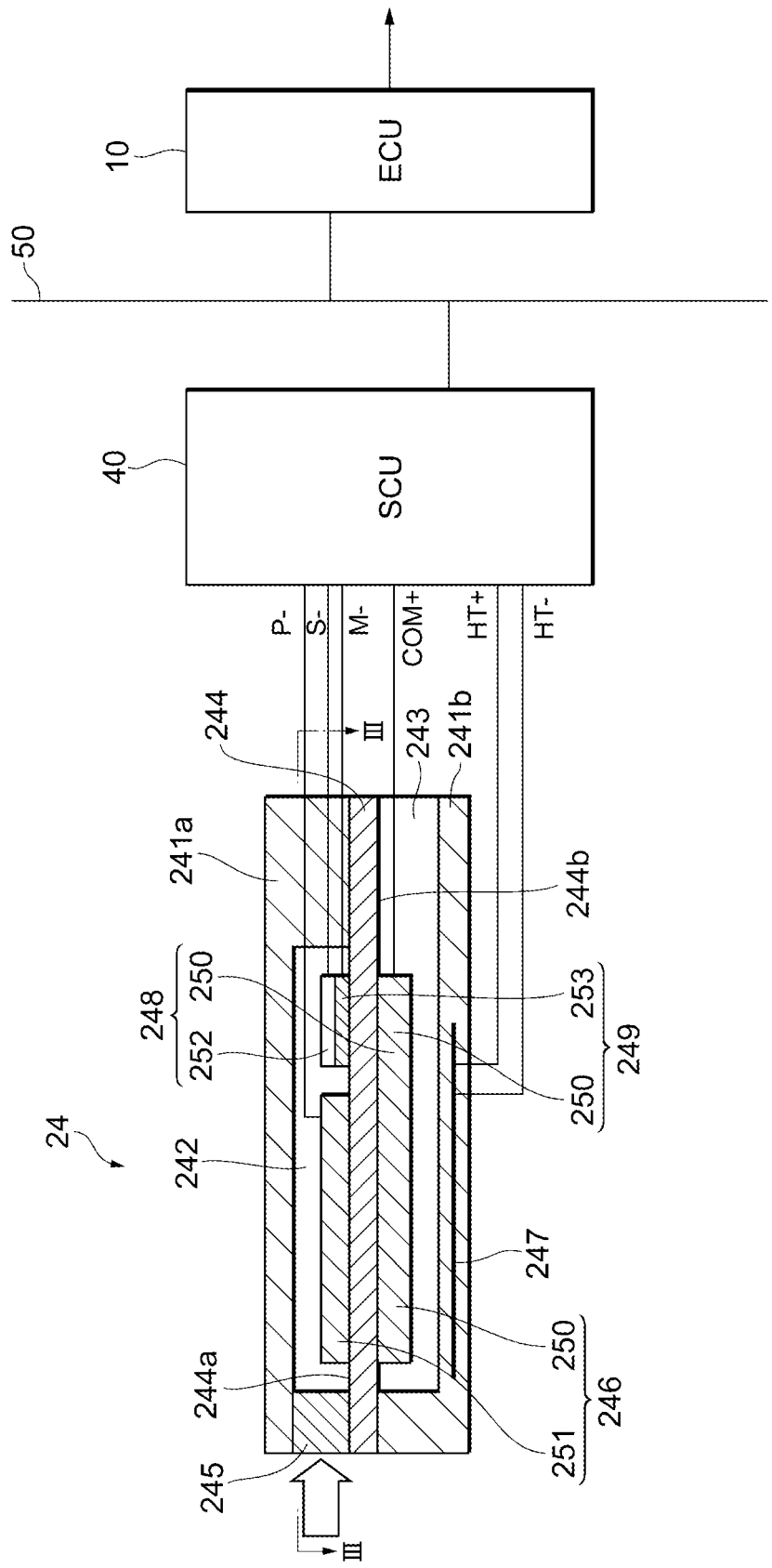
FIG. 2 shows a schematic view of a configuration of a NOx sensor shown in FIG. 1.

As shown in FIGS. 2 and 3, the first NOx sensor 24 includes a first main body portion 241a, a second main body portion 241b, a solid electrolyte body 244, a diffusion resistor 245, a pump electrode 251, a heater 247, a sensor electrode 252, a monitor electrode 253, and a common electrode 250.

A pump cell 246 that adjusts the oxygen concentration in the exhaust gas is formed by the pump electrode 251, the common electrode 250, and a part of the solid electrolyte body 244.

A monitor cell 248 that detects the oxygen concentration in a measurement chamber 242 is formed by the monitor electrode 253, the common electrode 250, and a part of the solid electrolyte body 244 based on an oxygen ion current flowing between the monitor electrode 253 and the common electrode 250.

A sensor cell 249 that detects the concentration (NOx concentration) of a predetermined gas component in the measurement chamber 242 of the sensor cell 249 is formed by the sensor electrode 252, the common electrode 250, and a part of the solid electrolyte body 244 based on the oxygen ion current flowing between the sensor electrode 252 and the common electrode 250.

The solid electrolyte body 244 is a plate-like member and is made of an oxygen ion conductive solid electrolyte material such as zirconia oxide.

The first main body portion 241a and the second main body portion 241b are disposed with the solid electrolyte body 244 interposed therebetween.

A recess is formed in the first main body portion 241a so as to be disposed retreating from the solid electrolyte body 244 side, and the recess functions as a measurement chamber 242 (gas chamber).

One side of the measurement chamber 242 is open, and the diffusion resistor 245 is disposed in the opened side thereof.

The diffusion resistor 245 is made of a porous material or a material having pores formed therein.

The speed of the exhaust gas drawn into the measurement chamber 242 is controlled by an action of the diffusion resistor 245.

The measurement chamber 242 is formed on a first main surface 244a side of the solid electrolyte body 244 and the exhaust gas is introduced therein.

A recess is formed also in the second main body portion 241b so as to be disposed retreating from the solid electrolyte body 244 side, and the recess functions as an atmospheric chamber 243 (reference gas chamber).

One side of the atmospheric chamber 243 is open.

The gas drawn into the atmospheric chamber 243 from the solid electrolyte body 244 side is released to the atmosphere.

The atmospheric chamber 243 is formed on the second main surface 244b side of the solid electrolyte body 244 and a reference gas is introduced therein.

The pump electrode 251, which is a cathode side, is disposed on a surface (the first main surface 244a) facing the measurement chamber 242 side of the solid electrolyte body 244 closer to the diffusion resistor 245.

The common electrode 250, which is an anode side, is disposed on a surface (the second main surface 244b) facing the atmospheric chamber 243 of the solid electrolyte body 244 and at a position corresponding to the pump cell 246.

The common electrode 250 is disposed so as to cover a region corresponding to the sensor electrode 252 and the monitor electrode 253.

When a voltage is applied between the pump electrode 251 and the common electrode 250, oxygen contained in the exhaust gas in the measurement chamber 242 contacts the pump electrode 251, which is the cathode side, to become oxygen ions.

The oxygen ions flow in the solid electrolyte body 244 toward the common electrode 250, which is the anode side, release electric charge in the common electrode 250 to become oxygen, and are discharged from the atmospheric chamber 243 into the atmosphere.

It should be noted that as the voltage applied between the pump electrode 251 and the common electrode 250 is higher, the amount of oxygen discharged from the exhaust gas by the pump cell 246 increases.

Conversely, as the voltage applied between the pump cell 246 and the common electrode 250 is lower, the amount of oxygen discharged from the exhaust gas by the pump cell 246 decreases.

Therefore, by increasing or decreasing the voltage applied between the pump electrode 251 and the common electrode 250, it is possible to increase or decrease the amount of residual oxygen in the exhaust gas flowing through the sensor cell 249 and the monitor cell 248 in a subsequent stage.

In the present embodiment, the voltage applied to the pump cell 246 is also referred to as a pump cell applied voltage Vp.

Further, the current outputted according to the applied voltage Vp is also referred to as a pump cell output current Ip.

The monitor electrode 253, which is the cathode side, is disposed on a surface of the solid electrolyte body 244 facing towards the measurement chamber 242, and a side opposite (on the downstream side in a gas flowing direction than the pump electrode 251 is) to the diffusion resistor 245 with the pump electrode 251 therebetween.

The common electrode 250, which is the anode side, is disposed on a surface of the solid electrolyte body 244 facing the atmospheric chamber 243 and at a position corresponding to the monitor electrode 253.

The monitor cell 248 detects the concentration of oxygen remaining in the exhaust gas from which oxygen has been discharged by the pump cell 246.

When a voltage is applied between the monitor electrode 253 and the common electrode 250, residual oxygen contained in the exhaust gas from which oxygen has been discharged by the pump cell 246 comes into contact with the monitor electrode 253, which is the cathode side, to become oxygen ions.

The oxygen ions flow in the solid electrolyte body 244 toward the common electrode 250, which is the anode side, release electric charge in the common electrode 250 to become oxygen, and are discharged from the atmospheric chamber 243 into the atmosphere.

The electric charge at this time is detected as the SCU 40 current Inn, and the residual oxygen concentration in the exhaust gas may be calculated based on the current Inn.

The sensor electrode 252, which is the cathode side, is disposed on the surface of the solid electrolyte body 244 facing towards the measurement chamber 242, and the side opposite (on the downstream side in the gas flowing direction than the pump electrode 251 is) to the diffusion resistor 245 with the pump electrode 251 therebetween.

The common electrode 250, which is the anode side, is disposed on the surface of the solid electrolyte body 244 facing the atmospheric chamber 243 and at a position corresponding to the sensor electrode 252.

The sensor electrode 252 is made of a Pt—Rh alloy (platinum-rhodium alloy), and has a strong reducibility with respect to NOx.

NOx contacting the sensor electrode 252 is reduced and decomposed into $N_2$ and $O_2$.

When a voltage is applied between the sensor electrode 252 and the common electrode 250, the decomposed $O_2$ receives charges from the sensor electrode 252, which is the cathode side, to become oxygen ions.

The oxygen ions flow in the solid electrolyte body 244 toward the common electrode 250, which is the anode side, release electric charge in the common electrode 250 to become oxygen, and are discharged from the atmospheric chamber 243 into the atmosphere.

The electric charge at this time is detected as the current Is by the SCU 40, and the concentration of NOx and the residual oxygen concentration in the exhaust gas may be calculated based on this electric current Is.

The sensor cell 249 composed of the sensor electrode 252 and the common electrode 250 detects the NOx concentration or the residual oxygen concentration in the exhaust gas from which oxygen has been discharged by the pump cell 246.

It should be noted that a current outputted from the sensor cell 249 according to the NOx concentration or the oxygen concentration in the exhaust gas is also referred to as a sensor cell output current Is.

Here, the sensor cell 249 tends to change the sensor cell output current Is, which is the output thereof, due to aged deterioration or the like even if the concentration of a measurement target gas in the exhaust gas is the same.

This tendency will be described with reference to FIGS. 4A, 4B, and 4C.

FIGS. 4A, 4B, and 4C schematically show a time transition of: (FIG. 4A) pump cell applied voltage Vp; (FIG. 4B) pump cell output current Ip; and (FIG. 4C) sensor cell output current Is.

In FIGS. 4A, 4B, and 4C, the pump cell applied voltage Vp is stepwisely decreased from Vp0 to Vp1 at time t0, so that the pump cell output current Ip decreases stepwise from Ip0 to Ip1, and the residual oxygen concentration of the exhaust gas that has passed through the pump cell 246 increases.

Thereafter, in the sensor cell 249, the sensor cell output current Is increases to a steady value via a transient response as the residual oxygen concentration in the exhaust gas increases.

In FIG. 4C, transient response characteristics of the sensor cell output current Is according to the step-like reduction of the pump cell applied voltage Vp are shown in characteristics at the time of manufacture of the NOx sensor (initial characteristics) and characteristics at the time of the NOx sensor being deteriorated (characteristics at deterioration).

As shown in FIG. 4C, there is a difference between the initial characteristic of the sensor cell output current Is and the characteristics at deterioration even when the exhaust gas supplied to the sensor cell has the same oxygen concentration.

More specifically, first, the steady value of the characteristics at deterioration tends to be lower than the steady value of the initial characteristics.

Second, a rise of the characteristics at deterioration tends to be slower than that of the initial characteristics.

For example, when looking at slopes of the characteristics between arbitrary times t1 and t2 during the transient change, a slope A of the characteristics at deterioration becomes less steeper than the slope A0 of the initial characteristics.

These tendencies become more prominent as deterioration of the sensor cell progresses.

Therefore, in the control device for the NOx sensor according to the present embodiment, by utilizing such output characteristics of the sensor cell 249, a deterioration detection function that estimates a deterioration amount of the NOx sensor (a deterioration rate of the sensor cell 249) is performed based on the slope of the sensor cell output current Is during the transient change when the pump cell applied voltage Vp is intentionally reduced stepwisely.

Further, in the control device for the NOx sensor according to the present embodiment, it is possible to perform an abnormality determination function that determines an abnormality due to deterioration of emission based on a detection result of the deterioration detection function.

Although these functions may be configured so that all of them are performed by the SCU 40 or may be performed by the ECU 10, it is more preferable that the SCU 40 performs the deterioration detection function, and the ECU 10 performs the abnormality determination function.

In the present embodiment, a configuration using the ECU 10 and the SCU 40 in combination as described above will be described as an example.

Note that the emission includes not only NOx detected by the NOx sensor but also HC, CO and the like.

The reason why the configuration in which the SCU 40 performs the deterioration detection function and the ECU 10 performs the abnormality determination function is preferable is as follows.

Since the deterioration detection function is sufficient to monitor the output of the sensor cell 249 that varies as the applied voltage Vp of the pump cell 246 is stepped down, it may be performed by the SCU 40 alone.

However, when performing the deterioration detection function under a condition that NOx of the engine exhaust gas fluctuates, since the output of the sensor cell 249 itself is influenced by the exhaust gas, it may be difficult to determine whether a reaction amount of the sensor cell 249 is due to $O_2$ reacted according to the decrease of the pump cell applied voltage Vp, or whether it is responsive to NOx in the original exhaust gas.

In addition, it is preferable to consider a determination of deterioration of emission by not only the deterioration degree of the NOx sensor but also an operating condition of the engine or various kinds of information detected by other sensors comprehensively.

Therefore, it is preferable that the ECU 10 performs the abnormality determination function.

Further, the control device for the NOx sensor according to the present embodiment can also perform a learning function to learn a correction amount of the sensor output based on the detection result of the deterioration detection function.

In the present embodiment, the SCU 40 performs this learning function.

As shown in FIG. 5, the SCU 40 includes an applied voltage switching unit 41 and a deterioration rate calculation unit 42 as functional blocks for performing the above deterioration detection function.

Further, the SCU 40 includes an output correction unit 43 as another functional block for performing the learning function.

As shown in FIG. 5, the ECU 10 includes an abnormality determination unit 11 as a functional block for performing the abnormality determination function.

The applied voltage switching unit 41 is an element for switching the pump cell applied voltage Vp to be applied to the pump cell 246.

In the present embodiment, the applied voltage switching unit 41 reduces the pump cell applied voltage Vp stepwise from Vp1 to Vp0 during performing the deterioration detection function.

The deterioration rate calculation unit 42 calculates the deterioration rate of the sensor cell 249 based on the slope during the transient change in the output of the sensor cell 249 according to the switching of the pump cell applied voltage Vp by the applied voltage switching unit 41.

The output correcting unit 43 is an element that corrects the sensor cell output current Is to generate a sensor cell output, and learns the correction amount of the sensor cell output based on the deterioration rate calculated by the deterioration rate calculation unit 42.

The abnormality determination unit 11 determines the deterioration of emission of the engine exhaust system ES based on the deterioration rate of the sensor cell 249 calculated by the deterioration rate calculation unit 42 of the SCU 40.

Preferably, in addition to the deterioration rate of the sensor cell 249, the abnormality determination unit 11 is possible to accurately determine the presence or absence of deterioration of emission by considering the outputs of the first and second NOx sensors 24, 30, various sensor information acquired by the ECU 10 from other sensors, the operating condition of the engine, and the like comprehensively.

The control device for the gas sensor (first and second NOx sensors 24, 30) according to the present embodiment is mainly configured to include the deterioration detection function (the applied voltage switching unit 41, the deterioration rate calculation unit 42) of the SCU 40, and may further includes the learning function (the output correction unit 43) or the abnormality determination function (the abnormality determination unit 11) of the ECU 10.

Next, an operation of the deterioration detection function will be described with reference to a flowchart of FIG. 6.

Figure 6:
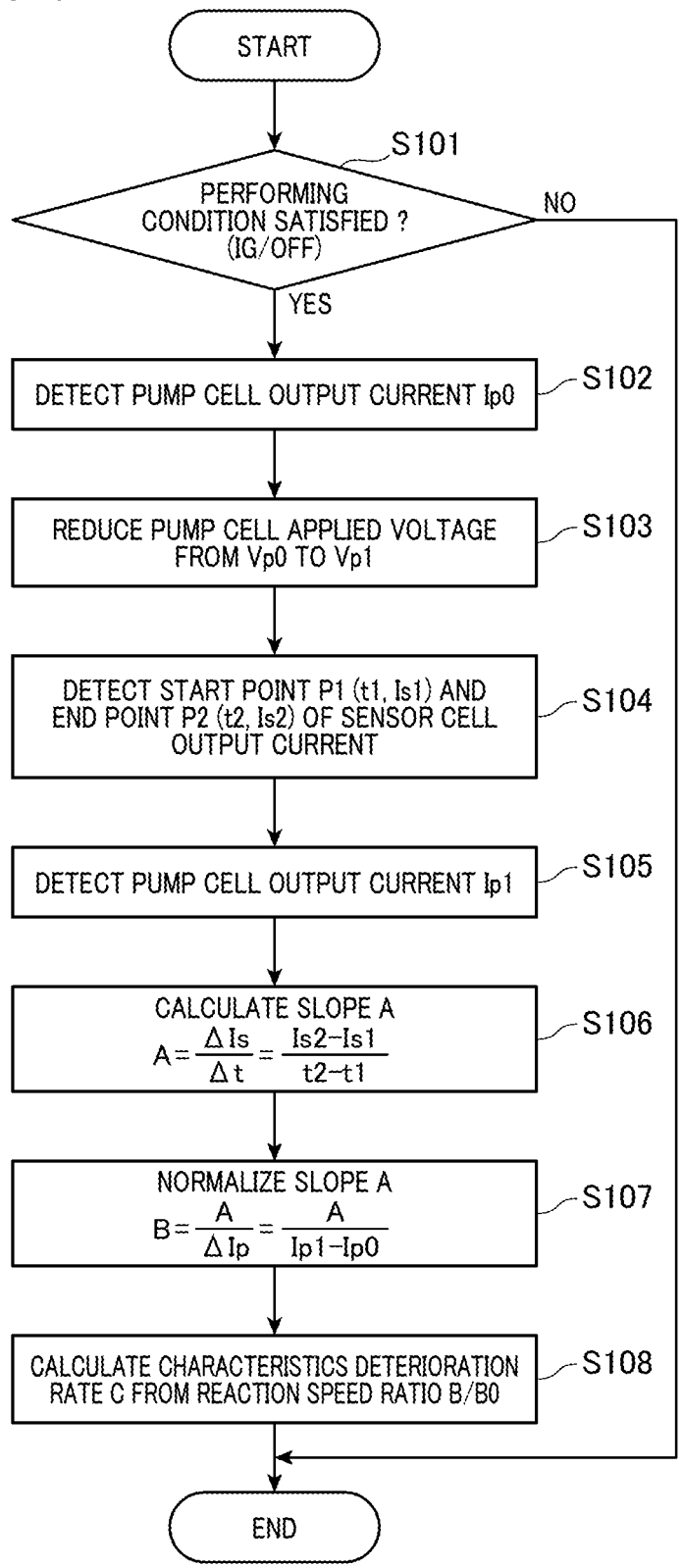
FIG. 6 is a flowchart of a deterioration detection function performed in the present embodiment.

The flowchart of FIG. 6 is executed by the SCU 40 at predetermined intervals, for example.

In step S101, it is determined by the applied voltage switching unit 41 whether or not a performing condition of the deterioration detection function is satisfied.

The performing condition of the present step is a condition indicating a state in which the deterioration detection function of the SCU 40 can be performed, and specifically, it can set that the SCU 40 receives a command from the ECU 10 to set to a condition where the deterioration detection function can be performed as a condition.

For example, the ECU 10 can transmit this command to the SCU 40 under a predetermined operating environment of the engine 20 in which the amount of the exhaust gas is relatively stable.

Under the predetermined operating environment, for example, may mean during a fuel cut operation, when an ignition is off (IG/OFF) or during the time a soak timer is in operation.

Particularly, it is desirable to set the performing condition as being during a period of time the ignition is off.

This is because when the ignition is off, the engine is stopped and the flow of the exhaust gas in the engine exhaust system ES disappears, so that the gas environment is stable and it becomes possible to stably perform the deterioration detecting function.

As a result of the determination in step S101, if the performing condition of the deterioration detection function is satisfied (Yes in step S101), the process proceeds to step S102, and if the of the deterioration detection condition is not satisfied (No in step S101), the present control flow ends.

In step S102, the pump cell output current Ip0 is detected by the deterioration rate calculation unit 42.

The current detected in the present step is a current before changing the applied voltage of the pump cell.

When the process of step S102 is completed, the process proceeds to step S103.

In step S103, a control of reducing the pump cell applied voltage stepwisely from Vp0 to Vp1 is performed by the applied voltage switching unit 41.

In the time chart of FIG. 4A, this control is performed at time t0.

It should be noted that, it is preferable that a predetermined waveform is used for a waveform of the voltage change when reducing the pump cell applied voltage Vp in the present step so that it becomes the same as a waveform when a later-described initial value B0 (refer to step S108) is measured.

As the predetermined waveform of the voltage change, for example, an arbitrary step waveform such as the step waveform shown in FIG. 4A can be used.

When the process of step S103 is completed, the process proceeds to step S104.

In step S104, a start point P1 and an end point P2 of the sensor cell output current are detected.

The start point P1 and the end point P2 are sensor cell outputs at two arbitrary timings during the transient response according to the switching of the pump cell applied voltage applied by the applied voltage switching unit 41 performed in step S103.

The start point P1 indicates the sensor cell output current Is1 at the time t1 during the transient response, and the end point P2 indicates the sensor cell output current Is2 at the time t2 during the transient response.

Time t1 of the start point P1 is earlier than time t2 of the end point P2.

Here, a range in which the start point P1 and the end point P2 can be set is a range within a predetermined period after switching of the pump cell applied voltage applied by the applied voltage switching unit 41 and before the output of the sensor cell 249 becomes stable.

Figure 7:
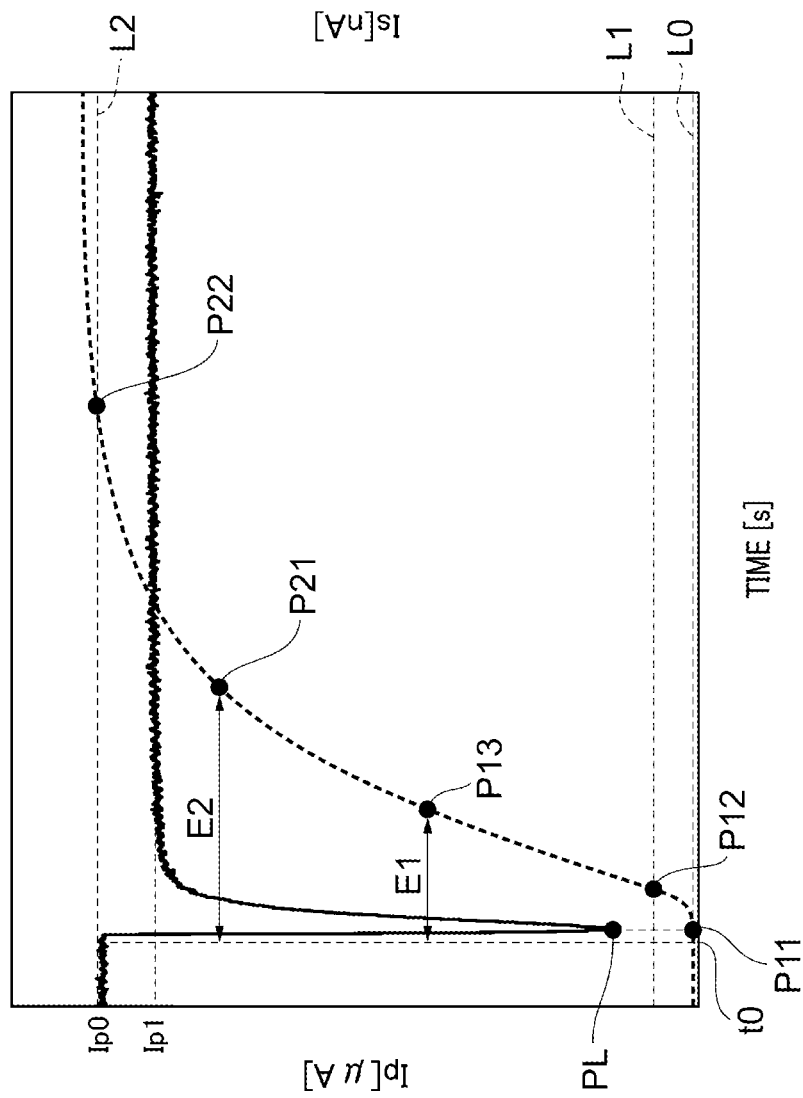
FIG. 7 shows a diagram of a starting point and an ending point used by a deterioration rate calculation unit.

As shown in FIG. 7, a detection timing of the start point P1 can be optionally selected from the following three points, for example:

(1) A point when it becomes the tailing lowest point PL of the pump cell output current Ip generated according to the switching of the pump cell applied voltage Vp (a point P11 in FIG. 7);

(2) A point when a predetermined time E1 (a first predetermined time) has elapsed after the switching of the pump cell applied voltage Vp (a point P13 in FIG. 7);

(3) A point when reaching 5% of an initial value of the sensor cell output fluctuation amount generated according to the switching of the pump cell applied voltage Vp (a point P12 in FIG. 7).

Here, "the initial value of the output fluctuation amount of the sensor cell 249" means a difference between a reference value before switching the output of the sensor cell 249 (line L0 in FIG. 7) and a steady value after switching when the switch cell applied voltage Vp is switched (reduced from Vp0 to Vp1) similar to the present occasion at the time of manufacturing the first and second NOx sensors 24, 30.

"When reaching 5% of the initial value" means that, as shown in FIG. 7, when the sensor cell output current Is arrives at a value (line L1 in FIG. 7) added up by 5% of the initial value of the output fluctuation amount from the reference value.

It should be noted that "5%" is merely an example and may be at least a percentage smaller than that set in the following (5), and an arbitrary percentage (a first predetermined percentage) other than 5% may be set.

Further, as shown in FIG. 7, the detection timing of the end point P2 can be optionally selected from the following two points, for example:

(4) A point when a predetermined time E2 (a second predetermined time) has elapsed after the switching of the pump cell applied voltage Vp (a point P21 in FIG. 7);

(5) A point when reaching 95% of the initial value of the sensor cell output fluctuation amount generated according to the switching of the pump cell applied voltage Vp (a point P22 in FIG. 7).

Here, "when reaching 95% of the initial value" means that, as shown in FIG. 7, when the sensor cell output current Is arrives at a value (line L2 in FIG. 7) added up by 95% of the initial value of the output fluctuation amount from the reference value.

It should be noted that "95%" is merely an example and may be at least a percentage larger than that set in the above (3), and an arbitrary percentage (a second predetermined percentage) other than 95% may be set.

Considering the early processing of deterioration diagnosis, it is preferable to set both the start point P1 and the end point P2 as early as possible, and among the above specific examples (1) to (5) described with reference to FIG. 7, it is most preferable to set the start point P1 to the above (1) and the end point P2 to the above (4).

When the process of step S104 is completed, the process proceeds to step S105.

In step S105, the pump cell output current Ip1 is detected by the deterioration rate calculation unit 42.

The current detected in the present step is a current after changing the applied voltage of the pump cell.

When the process of step S105 is completed, the process proceeds to step S106.

In step S106, the deterioration rate calculation unit 42 calculates the slope A of the output of the sensor cell 249 during the transient change by using the start point P1 and the end point P2 detected in step S104.

The slope A is calculated, for example, by the following equation (1).

[Math. 1]

$$A = \frac{\Delta Is}{\Delta t} = \frac{Is2 - Is1}{t2 - t1} \quad (1)$$

Here, $\Delta Is$ is a difference between the sensor cell output current Is1 at the start point P1 and the sensor cell output current Is2 at the end point P2.

In addition, $\Delta t$ is a difference between the time t1 of the start point P1 and the time t2 of the end point P2.

Note that the slope A0 in the initial characteristics shown in FIGS. 4A and 4B can also be calculated using the above-mentioned equation (1).

When the process of step S106 is completed, the process proceeds to step S107.

In step S107, the slope A calculated in step S106 is normalized by the deterioration rate calculation unit 42.

As shown in the following equation (2), the deterioration rate calculation unit 42 uses a variation amount of the pump cell output current Ip according to the switching of the pump cell applied voltage Vp to divide the slope A calculated in step S 106 to normalize the slope A, and calculates the normalized slope B.

[Math. 2]

$$B = \frac{A}{\Delta Ip} = \frac{A}{Ip1 - Ip0} \quad (2)$$

Here, $\Delta Ip$ is a difference between the pump cell output current Ip0 detected in step S 102 before changing the pump cell applied voltage and the pump cell output current Ip1 detected in step S105 after changing the pump cell applied voltage.

When the process of step S107 is completed, the process proceeds to step S108.

In step S108, the deterioration rate calculation unit 42 calculates a deterioration rate C of the sensor cell 249 based on the ratio between the slope B normalized in step S107 and an initial value B0.

Here, the initial value B0 is an initial value of a normalized slope calculated by using the above-mentioned equations (1) and (2) by performing the switching of the applied voltage Vp of the pump cell (reduced from Vp0 to Vp1) similar to the present occasion at the time of manufacturing the first and second NOx sensors 24, 30 (that is, a state in which the sensor cell 249 shows initial characteristics shown in FIG. 4C).

Further, the ratio B/B0 of the normalized slope B and the initial value B0 means a ratio of a transient response speed in the characteristics at deterioration and the initial characteristics shown in FIG. 4C.

The ratio B/B0 can be expressed as a "reaction speed ratio" with respect to the oxygen introduced into the sensor cell 249.

Figure 8:
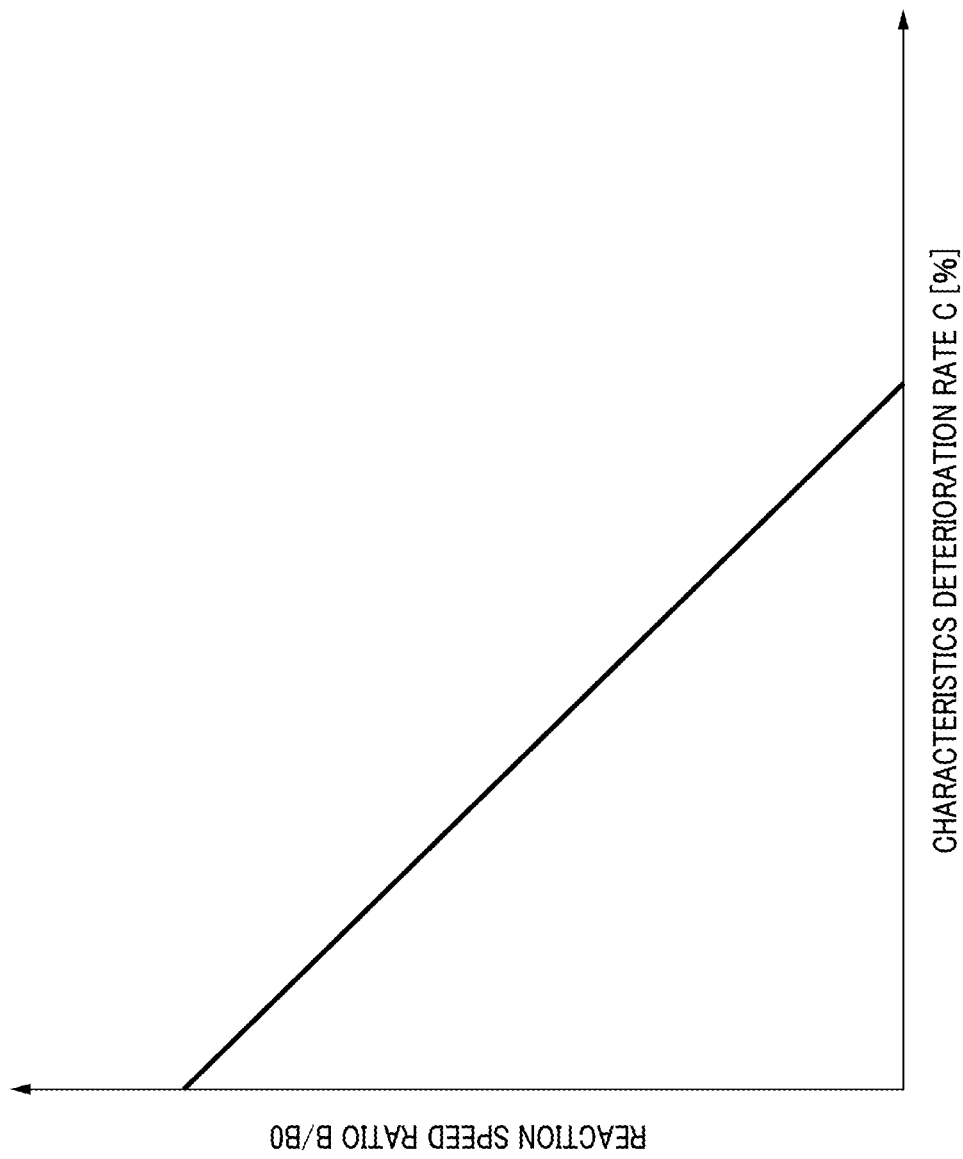
FIG. 8 shows a diagram of a relationship between a reaction rate ratio and a characteristics deterioration rate.

As shown in FIG. 8, the reaction speed ratio B/B0 is correlated with the deterioration rate C [%] of the output characteristics of the sensor cell 249.

More specifically, as the reaction speed ratio B/B0 increases, that is, as the difference between the characteristics at deterioration of the sensor cell 249 and the initial characteristics decreases, the deterioration rate C decreases, and thus the degree of deterioration of the sensor cell 249 decreases.

On the other hand, as the reaction speed ratio B/B0 decreases, that is, as the difference between the characteristics at deterioration and the initial characteristics of the sensor cell 249 increases, the deterioration rate C increases, and thus the degree of deterioration of the sensor cell 249 increases.

Therefore, the deterioration rate calculation unit 42 is capable of calculating the deterioration rate C using the reaction speed ratio B/B0.

The deterioration rate calculation unit 42 outputs the information on the calculated deterioration rate C to the output correction unit 43 and the abnormality determination unit 11 of the ECU 10.

When the process of step S108 is completed, the present control flow ends.

Next, an operation of the learning function will be described with reference to FIGS. 9 and 10.

As described above, the sensor cell 249 of the first and second NOx sensors 24, 30 tends to change the sensor cell output current Is, which is the output thereof, due to age deterioration or the like even if the concentration of a measurement target gas in the exhaust gas is the same. This tendency is shown in FIG. 9.

Figure 9:
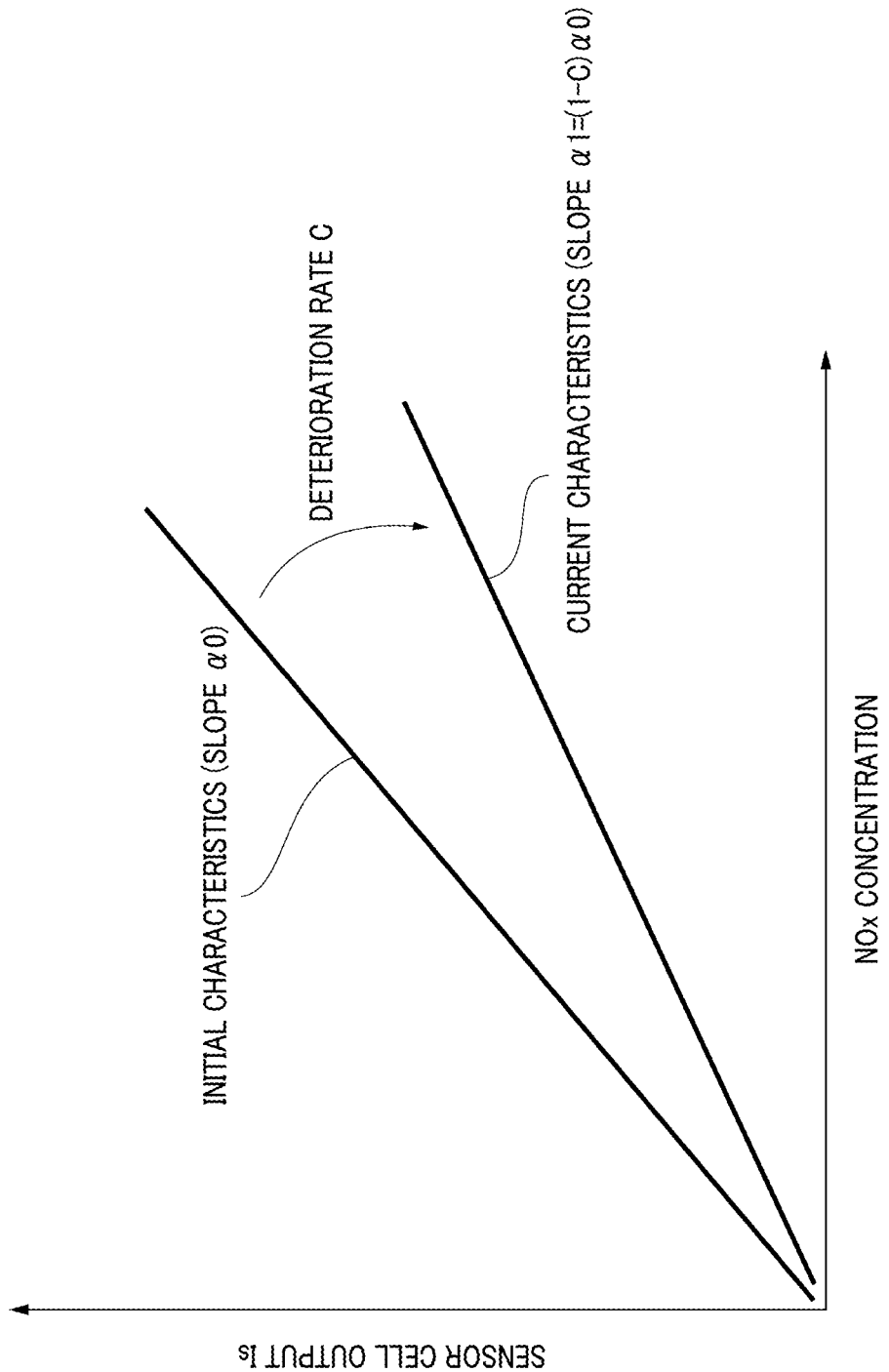
FIG. 9 shows a relationship between the sensor cell output and a NOx concentration.

A horizontal axis of FIG. 9 indicates the NOx concentration in the exhaust gas introduced into the sensor cell 249, and a vertical axis of FIG. 9 indicates the sensor cell output current Is outputted from the sensor cell 249 according to this NOx concentration.

FIG. 9 shows two types of characteristics: characteristics between the NOx concentration and the sensor cell output at the time of manufacturing the NOx sensor (initial characteristics) and characteristics when the deterioration rate of the sensor cell 249 is C [%] (current characteristics).

As shown in FIG. 9, the characteristics of the NOx concentration and the sensor cell output have the largest slope α (alpha) 0 of the initial characteristic, and a slope α1 of the current characteristic tends to decrease according to the deterioration rate C.

The slope α1 of the current characteristics can be expressed by the following equation (3) using the deterioration rate C and the slope α0 of the initial characteristics.
[Math. 3]

$$\alpha 1 = (1-C)\alpha 0 \quad (3)$$

In the learning function of the present embodiment, the sensor cell output is corrected in a direction to return the current characteristics to the initial characteristics by using the relationship between the deterioration rate C and the slope α1 of the characteristics.

In other words, the correction amount (a correction coefficient k to be described later) of the output of the sensor cell is learned by using the deterioration rate C calculated by the deterioration detection function.

A procedure of an operation of the learning function will be described along the flowchart of FIG. 10.

Figure 10:
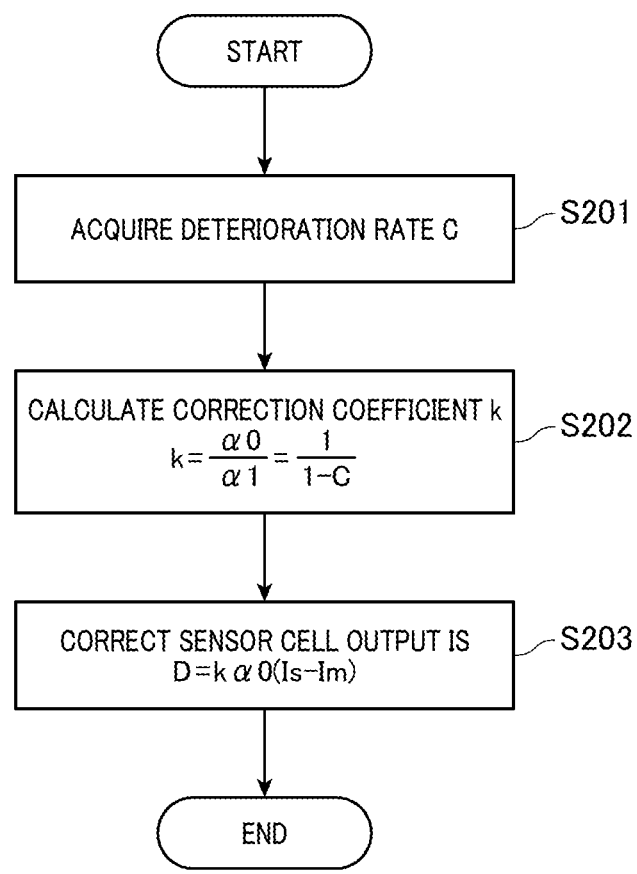
FIG. 10 shows a flowchart of a learning function performed in the present embodiment.

The flowchart of FIG. 10 is executed at predetermined intervals, for example, by the output correction unit 43 of the SCU 40.

In step S201, the information on the deterioration rate C of the sensor cell 249 calculated by the deterioration rate calculation unit 42 is acquired.

When the process of step S201 is completed, the process proceeds to step S202.

In step S202, the correction coefficient k is calculated using the deterioration rate C acquired in step S201.

The correction coefficient k is a correction amount of the sensor output current Is, which is appropriately adjusted according to the current deterioration rate C of the sensor cell in order to return the current characteristics shown in FIG. 9 to the initial characteristics.

The correction coefficient k is adjusted based on a ratio between the slope α1 of the current characteristics shown in FIG. 9 and the slope α0 of the initial characteristics, and is set to become larger as the slope α1 becomes smaller with respect to the slope α0.

The correction coefficient k can be calculated, for example, by the following equation (4) based on the relationship between α1 and α0, and the above equation (3).

[Math. 4]

$$k = \frac{\alpha 0}{\alpha 1} = \frac{1}{1-C} \quad (4)$$

When the process of step S202 is completed, the process proceeds to step S203.

In step S203, the sensor cell output is corrected using the correction coefficient k calculated in step S202.

The output correction unit 43 corrects the sensor cell output using, for example, the correction equation shown in the following equation (5).
[Math. 5]

$$D = k \cdot \alpha 0 \cdot (Is - Im) \quad (5)$$

Here, D indicates the sensor cell output after correction, and has a correspondence relationship with the NOx concentration equivalent to the initial characteristics in FIG. 9.

Further, α0 indicates the slope of the initial characteristics in FIG. 9, which is a fixed value stored in advance by the SCU 40.

Furthermore, Is indicates the sensor cell output current detected from the sensor cell 249 of the current characteristic, and Im indicates the monitor cell output current detected from the monitor cell 248.

The SCU 40 is capable of detecting the NOx concentration accurately without being affected by the degree of deterioration of the sensor cell by calculating the NOx concentration using the corrected sensor cell output D calculated by the output correcting unit 43.

When the process of step S203 is completed, the present control flow ends.

Next, effects of the control device for the first and second NOx sensors 24, 30 according to the present embodiment will be described.

The SCU 40 as a control device for the first and second NOx sensors 24, 30 according to the present embodiment functions as a control device for controlling the operations of the first and second NOx sensors 24, 30, each of which includes the pump cell 246 for adjusting the oxygen concentration of the exhaust gas of the engine according to the applied voltage Vp, and the sensor cell 249 for detecting the concentration of NOx from the exhaust gas of which the oxygen concentration has been adjusted by the pump cell 246.

The SCU 40 includes an applied voltage switching unit 41 for switching the applied voltage Vp of the pump cell 246 when the deterioration detecting function is performed, and the deterioration rate calculation unit 42 that calculates the deterioration rate C of the sensor cell 249 based on the slope A during the transient change in the output of the sensor cell 249 according to the switching of the applied voltage Vp by the applied voltage switching unit 41.

With this configuration, deterioration of the sensor cell 249 can be used for measuring responsiveness.

In other words, as described with reference to FIG. 4, the transient response characteristic of the output of the sensor cell 249 according to the switching of the pump cell applied voltage Vp tends to change according to the degree of deterioration of the sensor cell 249.

In the present embodiment, by utilizing the slope A during the transient change among the transient response characteristics, it is possible to ascertain the degree of deterioration based on the change in the transient response characteristics, and is possible to accurately calculate the deterioration rate C of the sensor cell 249.

Further, since the deterioration rate is obtained based on the slope A during the transient change, the transient response can be detected before it stabilizes at the steady value, so that the time required for the deterioration determination is short and the deterioration diagnosis can be performed quickly.

As described above, according to the present embodiment, the deterioration diagnosis of sensor output can be appropriately performed with the above configuration.

In addition, in the present embodiment, the applied voltage switching unit 41 reduces the applied voltage Vp of the pump cell 246 stepwise from Vp0 during the normal use to the predetermined value Vp1 at the time of performing the deterioration detection function.

With this configuration, since there is no load on the pump cell 246 due to the performance of the deterioration detection function, and there is no fear of element damage (blackening) or electrode deterioration of the pump cell 246, optimum deterioration diagnosis can always be made.

It should be noted that "blackening" specifically refers to a phenomenon where oxygen ions of $ZrO_2$ are released due to electric field effects, and these oxygen ion defects produce a blackened appearance and also degrade properties of the $ZrO_2$ solid electrolyte such as strength.

Further, in the present embodiment, the deterioration rate calculation unit 42 calculates the deterioration rate of the sensor cell based on the ratio between the slope A during the transient change in the output of the sensor cell 249 according to the switching of the applied voltage Vp by the applied voltage switching unit 41 and the initial value.

With this configuration, the degree of deterioration from the initial state can be accurately estimated by comparing the slope A during the transient change with the initial value (the slope during the transient change at the time of manufacturing the sensor).

Further, in the present embodiment, the deterioration rate calculation unit 42 calculates the slope A during the transient change in the output of the sensor cell 249 according to the change of the applied voltage Vp by the applied voltage switching unit 41, and the slope A is normalized by dividing the calculated slope A by using the output deviation ΔIp of the pump cell accompanying the switching of the applied voltage, thereby calculates the deterioration rate C of the sensor cell 249 based on the ratio between the normalized slope B and the normalized initial value B0.

With this configuration, the degree of deterioration from the initial state can be estimated more accurately by normalizing the slope (the slope B after normalization) during the transient change so as to eliminate the influence of the difference in the operation of the pump cell 246 and comparing with the initial value.

Further, in the present embodiment, the deterioration rate calculation unit 42 detects the output of the sensor cell 249 as the start point P1 and the end point P2 after the switching of the applied voltage Vp by the applied voltage switching unit 41 and at the two arbitrary timings within a predetermined period before the output of the sensor cell 249 becomes stable, and calculates a slope of a line segment connecting the start point P1 and the end point P2 as the slope A of the output of the sensor cell 249 during the transient change.

With this configuration, since it is possible to calculate the slope A during the transient change by setting an arbitrary section during the transient response of the sensor cell output, the degree of freedom of the deterioration detection function can be improved as well as the estimation accuracy of the deterioration rate can be enhanced.

Further, in the present embodiment, the output Is of the sensor cell 249 at any of the following points is included as the start point P1 detected by the deterioration rate calculation unit 42:

(1) The point when it becomes the tailing lowest point PL of the output of the pump cell 246 (the pump cell output current Ip) generated according to the switching of the applied voltage Vp (the point P11 in FIG. 7);

(2) The point when the first predetermined time E1 has elapsed after the switching of the applied voltage Vp (the point P13 in FIG. 7); or (3) The point when reaching 5% of the initial value of the output fluctuation amount of the sensor cell 249 generated according to the switching of the pump cell applied voltage Vp (the point P12 in FIG. 7).

Further, the output of the sensor cell at any one of the following points is included as the end point P2 detected by the deterioration rate calculation unit 42;

(4) The point when the second predetermined time E2 has elapsed after the switching of the applied voltage Vp (the point P21 in FIG. 7); or (5) The point when reaching 95% of the initial value of the output fluctuation amount of the sensor cell 249 generated according to the switching of the applied voltage Vp (the point P22 in FIG. 7).

With this configuration, it is possible to calculate the slope A so that the changes in the transient response characteristics according to the degree of deterioration of the sensor cell can be easily detected by selecting the start point P1 from the above (1) to (3) and selecting the end point P2 from the above (4) to (5), thereby the estimation accuracy of the deterioration rate can be further enhanced.

Further, in the present embodiment, the first and second NOx sensors 24, 30 are installed in the exhaust system ES of the engine 20 and configured to detect the NOx concentration from the exhaust gas of the engine 20.

Then, under the predetermined operating environment of the engine 20 (for example, during the fuel cut operation, when the ignition is off, or during the time the soak timer is in operation) in which the amount of the exhaust gas is stable, the applied voltage switching unit 41 of the SCU 40 performs the switching of the applied voltage Vp in the deterioration detection function, and the deterioration rate calculation unit 42 calculates the deterioration rate.

With this configuration, the output fluctuation of the sensor cell 249 generated during the performance of the deterioration detection function is hardly influenced by the fluctuation of the NOx concentration in the exhaust gas, and the switching of the applied voltage Vp by the applied voltage switching unit 41 will be the main influence.

Therefore, the correlation between the slope A during the transient change of the sensor cell output calculated by the deterioration rate calculation unit 42 and the degree of deterioration of the sensor cell can be enhanced, and the estimation accuracy of the deterioration rate can be further enhanced.

Further, in the present embodiment, it is preferable particularly that the predetermined operating environment of the engine 20 in which the amount of the exhaust gas is stable includes the time when the ignition is off.

Specific examples of the predetermined driving environment include, for example, during the fuel cut operation, when the ignition is off, or during the time the soak timer is in operation.

Among them, since the gas environment is stable when the ignition is off, or during the time the soak timer is in operation, the detection accuracy is better than during the fuel cut operation.

However, since most vehicles do not have such a timer, the operating condition is most preferably when the ignition is off.

Further, in the present embodiment, the respective first and second NOx sensors 24, 30 has the measurement chamber 242 into which the exhaust gas is introduced, and the pump cell 246 and the sensor cell 249 are disposed in the measurement chamber 242.

With this configuration, since it is possible to generate the transient change of the sensor cell 249 sensitively according to the switching of the applied voltage of the pump cell by disposing the pump cell 246 that adjusts the oxygen concentration in the measurement chamber 242 and the sensor cell 249 that detects the oxygen concentration in the same measurement chamber 242, it is possible to calculate the deterioration rate more quickly.

Further, the SCU 40 as the control device for the first and second NOx sensors 24, 30 according to the present embodiment includes the output correction unit 43 that learns the correction amount (correction coefficient k) of the output of the sensor cell 249 based on the deterioration rate C calculated by the deterioration rate calculation unit 42.

With this configuration, since the sensor output can be appropriately corrected according to the degree of deterioration of the sensor cell 249, the detection accuracy of the NOx concentration by the NOx sensor can be improved.

Further, the ECU 40 as the control device for the first and second NOx sensors 24, 30 according to the present embodiment includes the abnormality determination unit 11 that determines deterioration of emission based on the deterioration rate C calculated by the deterioration rate calculation unit 42 of the SCU 40.

There is a possibility that the detection accuracy of the NOx concentration by the NOx sensor may decrease if the degree of deterioration of the sensor cell 249 increases, and this may contribute to deterioration of emission.

The abnormality determination unit 11 can determine the occurrence of deterioration of emission with higher accuracy by considering highly accurate information on the degree of deterioration of the sensor cell 249 as one piece of information for making a determination.

Here, the difference between the present embodiment and the conventional deterioration diagnosis method disclosed in JP Publication No. '013 presented as the related art will be described.

In JP Publication No. '013, deterioration diagnosis of a sensor cell is performed based on a change amount between an initial value of a sensor cell output and a value after stabilization when a pump cell applied voltage is switched.

In this case, since it is necessary to wait until a transient response of the sensor cell output converges, there are disadvantages that deterioration diagnosis requires time, opportunity for deterioration diagnosis decreases, and the like.

In contrast, in the present embodiment, deterioration diagnosis is performed based on the slope A during the transient change of the sensor cell output when the pump cell applied voltage is switched.

For this reason, the deterioration diagnosis can be performed before the transient response of the sensor cell converges, thus the time required for deterioration diagnosis can be shortened and the chances of deterioration diagnosis can be increased compared with the method of JP Publication No. '013.

Further, in JP Publication No. '013, the pump cell applied voltage is switched higher than that in normal control.

In this case, there are disadvantages such as electrode deterioration of the pump cell and possibility of element damage (blackening).

In contrast, in the present embodiment, the pump cell applied voltage is switched lower than that in the normal control.

Therefore, there is no load on the pump cell 246, there is no fear of deterioration of the electrode of the pump cell 246 or damage to the element, and thereby optimum deterioration diagnosis can always be performed.

In addition, in JP Publication No. '013, a determination value of the deterioration diagnosis is calculated by dividing a change amount $\Delta Is$ of the sensor cell output by a variation amount of a pump cell applied voltage Vp.

On the other hand, in the present embodiment, the normalized slope B used for calculating the characteristics deterioration rate C is calculated by dividing the change amount $\Delta Is$ of the sensor cell output by the change amount $\Delta p$ of the pump cell output current.

Although both aim at normalization of the $O_2$ leakage amount, the method of the present embodiment using the change amount $\Delta Ip$ of the pump cell output current can more accurately indicate the leakage amount.

Further, since the $O_2$ leakage amount between each sensor, or even in the same sensor of initial/after deterioration differs even with the same voltage change amount, so that the difference in leakage amount cannot be canceled by normalization by the applied voltage amount Vp as in JP Publication No. '013.

Therefore, it is possible to improve the accuracy of normalizing the $O_2$ leakage amount by normalizing with the current change amount $\Delta Ip$ as in the present embodiment.

Furthermore, while the method of JP Publication No. '013 performs only the deterioration diagnosis, the method of the present embodiment can properly perform not only the deterioration diagnosis but also the output correction of the sensor cell output.

[Modifications]

Next, modifications of the above-mentioned embodiment will be described with reference to FIGS. 11 to 14.

Although the configuration in which any two points in the transient response are selected as the start point P1 and the end point P2 used by the deterioration rate calculation unit 42 for calculating the slope A during the transient has been exemplified in the above embodiment, however, a plurality of sensor cell outputs may be averaged to calculate the start point P1 and the end point P2 alternatively.

Figure 11:
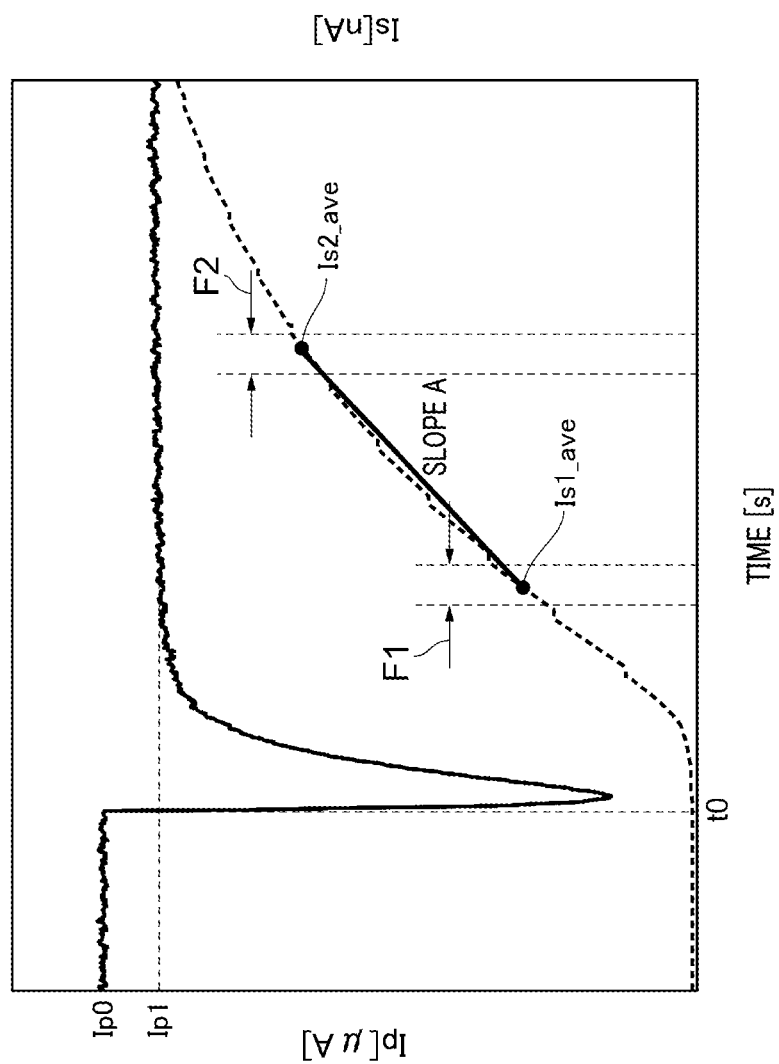
FIG. 11 shows a diagram for explaining a process of calculating a start point and an end point by an averaging process in a modification of the embodiment.

In this case, for example, as shown in FIG. 11, outputs of a plurality of sensor cells 249 are averaged in a predetermined start point period P1 including the start point P1 and a predetermined end point period F2 including the end point P2, respectively, and the averaged sensor cell outputs Is1_ave and Is2_ave are calculated.

Then, the slope A is calculated using the start point P1 (Is1_ave, t1) and the end point P2 (Is2_ave, t2) calculated by an averaging process.

Thereby, it is possible to reduce the influence of variations in the sensor cell output Is during the transient response, and the accuracy of the deterioration diagnosis can be improved.

The deterioration rate calculation unit 42 calculates the slope A only once during the transient change of the sensor cell output when the switching process of the pump cell applied voltage applied by the applied voltage switching unit 41 is executed once, and the deterioration rate C is calculated using one slope A in the above embodiment.

Figures 12A, 12B:
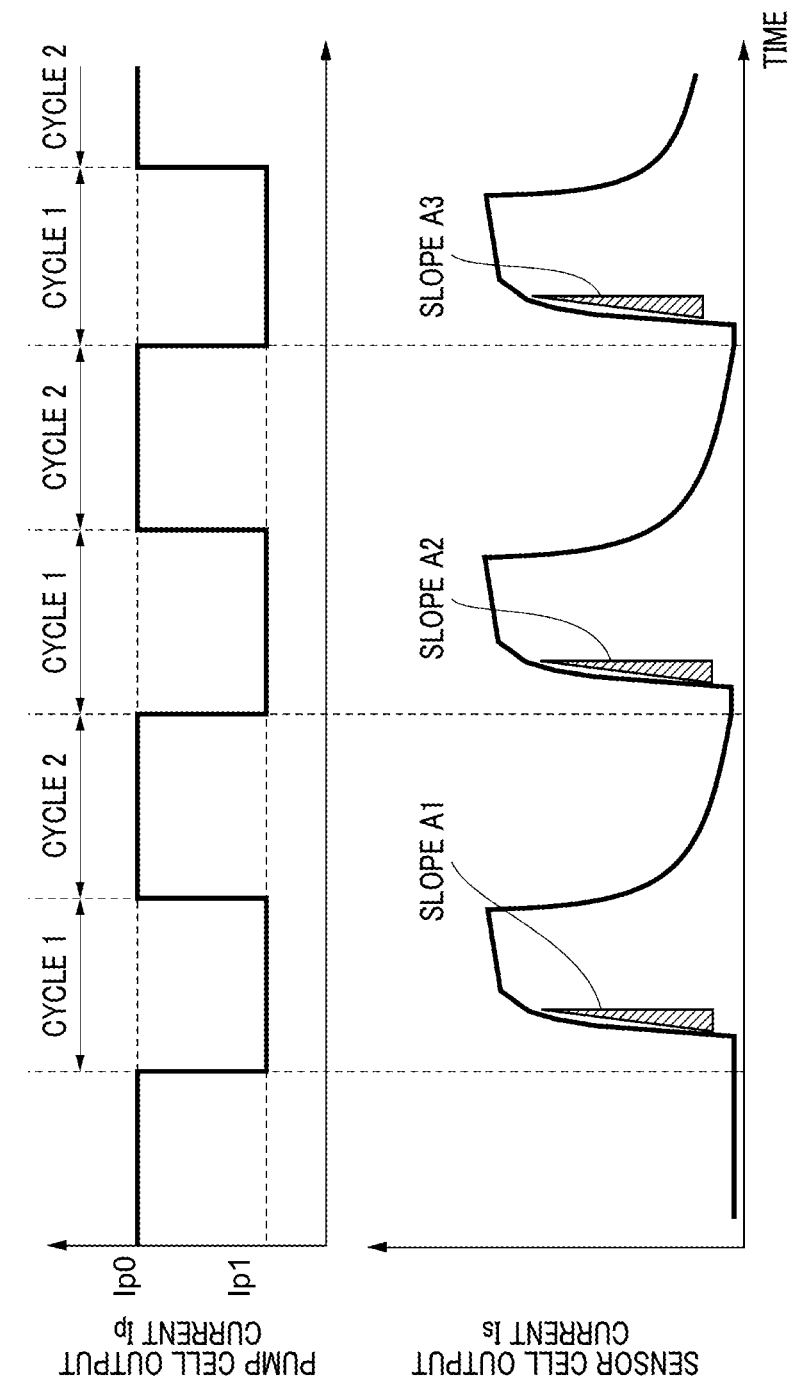
FIGS. 12A and 12B show diagrams for explaining a process of calculating slopes at a plurality of transient responses in the modification of the embodiment.

On the other hand, as shown in FIGS. 12A and 12B, it may be configured that the applied voltage switching unit 41 performs the switching of the applied voltage for a plurality of times, the deterioration rate calculation unit 42 calculates the slopes A1 to A3 during the transient change of the sensor cell for a plurality of times, and the deterioration rate C of the sensor cell 249 is calculated based on the plurality of times of the slopes A1 to A3.

FIG. 12A shows a time transition of the pump cell output current Ip, and FIG. 12B shows a time transition of the sensor cell output current Is.

A behavior of the pump cell output current Ip is interlocked with a behavior of the pump cell applied voltage Vp.

As shown in FIG. 12A, the pump cell 246 repeats a cycle 1 for lowering the pump cell applied voltage Vp to a predetermined value Vp1 (refer to FIG. 4A) and a cycle 2 for increasing the pump cell applied voltage Vp for returning to a normal voltage Vp0 (refer to FIG. 4A).

At this time, as shown in FIG. 12B, the sensor cell output repeats the transient response according to the increase or decrease of the pump cell applied voltage Vp.

The deterioration rate calculation unit 42 performs the above deterioration detection function when the pump cell 246 is in a state of the cycle 1, and is capable of calculating the slopes A1, A2, A3 during plural transient changes of the sensor cell 249.

The deterioration rate calculation unit 42 can improve robustness of the deterioration detection function and prevent erroneous diagnosis of the deterioration determination or the like from occurring by using the plurality of times of the slopes A1 to A3 for calculating the deterioration rate C.

It should be noted that the applied voltage switching unit 41 may perform repetitive operations of the cycle 1 and cycle 2 shown in FIGS. 12A and 12B in a single period that continuously satisfies a predetermined operation environment (for example, during the fuel cut operation, when the ignition is off, or during the time the soak timer is in operation) in which the amount of exhaust gas is stable.

The deterioration rate calculation unit 42 calculates the slopes A1 to A3 during the transient changes of the plurality of times of the sensor cell outputs in a plurality of cycles 1 in the single period, and is capable of calculating the deterioration rate C of the sensor cell 249 based on the slopes A1 to A3.

As described above, in the deterioration detecting function of the present embodiment, since the deterioration rate is calculated based on the slope during the transient change, it is possible to perform the deterioration diagnosis quickly.

As a result, since the time required for one diagnosis can be short, it is possible to perform multiple diagnoses at one opportunity, and it is possible to efficiently and accurately diagnose deterioration.

Further, in the predetermined driving environment in which the amount of the exhaust gas is stable, the deterioration rate calculation unit 42 may also calculate the deterioration rate C by using past values of the slope during the transient change of the sensor cell output calculated under the same operating environment in the past.

For example, in conjunction with the example of FIG. 12B, under the predetermined operating environment, the deterioration rate calculation unit 42 calculates the slope A3 during the transient change of the sensor cell output according to the change of the applied voltage Vp by the applied voltage switching unit 41.

At this time, the past values A1 and A2 of the slopes calculated in the same driving environment in the past are read out.

Then, the deterioration rate C of the sensor cell 249 is calculated based on the slope A3 calculated in the current process and the read past values A1 and A2.

Further, as described with reference to FIGS. 12A and 12B, in the case when the deterioration rate based on the slope during the transient change of the plurality of times of the sensor cell outputs is calculated, the deterioration rate calculation unit 42 may use the calculated plurality of slopes by averaging them.

Similarly, a plurality of calculated values of the reaction speed ratio B/B0 used for calculating the deterioration rate C in step S108 of FIG. 6 can be averaged and used.

In FIG. 13, a plurality of times of the reaction speed ratios B/B0 are represented by reference symbol G.

In the drawing, n indicates an arbitrary calculation number.

As shown in FIG. 13, an average value G_ave of the reaction speed ratios G acquired at five times, for example, may be calculated and used for calculating the deterioration rate C.

Here, using N+fifth data G (n+5) for an example, an average value G_ave (n+5) of the five data including all of the data in the last four from the N+fifth, which are G (n+1), G (n+2), G (n+3), and G (n+4), is calculated.

Note that the data used in the averaging process is not limited to the latest continuous data, but it is also possible to use, for example, only a part of data in which heterogeneous data is removed.

For example, the average value G_ave (n) of the N th data G (n) in FIG. 13 and the average value G_ave (n+1) of the N+1 th data G (n+1), the N+3 th data G (n+3), which is clearly heterogeneous, is excluded and the averaging process is carried out.

Further, when the operating environment in which the deterioration detecting function is performed is in a state where the engine 20 is stopped such as when the ignition is off, for example, the applied voltage switching unit 41 may switch the pump cell applied voltage Vp by stop applying the pump cell application voltage Vp to the pump cell 246 instead of an operation of reducing the pump cell applied voltage from the normal voltage Vp0 to the predetermined value Vp1.

As a result, since it is unnecessary to supply power from the SCU 40 to the pump cell 246 when performing the deterioration detection function, deterioration in fuel efficiency can be suppressed from occurring.

Further, although the first and second NOx sensors 24, 30 having the configuration in which both the pump cell 246 and the sensor cell 249 are disposed in the single measurement chamber 242 is exemplified in the above embodiment, the configuration is not limited thereto.

For example, the NOx sensor may have a plurality of measurement chambers, and the pump cell and the sensor cell may be disposed in different measurement chambers, respectively. An example of such a configuration is shown in FIG. 14.

A sensor element 110a of a NOx sensor 110 shown in FIG. 14 includes a first chamber 14 having an exhaust inlet and a second chamber 16 communicating with the first chamber 14 via a throttling portion 15.

Both the chambers 14, 16 correspond to the measurement chamber 242 of the above embodiment.

A pump cell 31 has a pair of electrodes 32, 33, and one of the electrodes 32 is disposed so as to be exposed in the first chamber 14.

A monitor cell 34 has an electrode 36 and a common electrode 38 that are positioned to face each other, and the electrode 36 is disposed so as to be exposed in the second chamber.

Likewise, a sensor cell 35 is disposed adjacent to the monitor cell 34, and has an electrode 37 and the common electrode 38 positioned to face each other, and the electrode 37 is disposed so as to be exposed in the second chamber.

As described above, even in a configuration in which the pump cell 31 and the sensor cell 35 are disposed in different measurement chambers (the first chamber 14 and the second chamber 16), each function such as the deterioration detection function of the above embodiment can be performed.

The embodiment of the present disclosure has been described with reference to specific examples. However, the present disclosure is not limited to these specific examples.

That is, those in which design modifications have been appropriately made by those skilled in the art to these specific examples are also included in the scope of the present disclosure as long as they have the features of the present disclosure.

For example, elements included in each of the above-described specific examples, and arrangements, materials, conditions, shapes, sizes, and the like thereof are not limited to those exemplified, and can be appropriately changed.

In addition, each element included in each of the above-described embodiments can be combined as long as technically possible, and combinations thereof are also included in the scope of the present disclosure.

The configuration in which the pump cell applied voltage is stepwisely reduced from Vp0 to Vp1 when the deterioration detecting function of the sensor cell 249 is performed has been exemplified in the above embodiment.

However, it is sufficient enough that the output of the sensor cell 249 generates the transient change according to the switching of the applied voltage of the pump cell 246, it is possible, for example, to configure that the pump cell applied voltage is stepwisely increased.

Similarly, a waveform of the voltage change during the switching of the pump cell applied voltage Vp is not limited to a step waveform, and any waveform that can generate a transient change in the output of the sensor cell 249 can be used.

Although the configuration of calculating the deterioration rate C of the sensor cell 249 based on the ratio between the normalized value B of the slope A and the initial value B0 corresponding to the value B was exemplified in the above embodiment, the present disclosure is not limited thereto.

For example, instead of normalizing the slope A, the deterioration rate C can be obtained based on a ratio between the slope A and the slope A0 of the initial characteristics, or the deterioration rate C may be obtained by a method other than comparing the ratio of the slope A and the slope A0.

Further, it may be configured that the deterioration rate C is obtained by a method other than the comparison with the initial value, such as comparing the slope A with a threshold other than the slope A0 of the initial characteristic, or using a function.

What is claimed is:

1. A system comprising:
a gas sensor including:
a pump cell for adjusting an oxygen concentration of a detected gas according to an applied voltage; and
a sensor cell for detecting a concentration of a specific gas component from the detected gas after the oxygen concentration has been adjusted by the pump cell; and
a computer system, including memory storing instructions and at least one computer processor for executing the instructions such that the computer system is programmed to:
switch an applied voltage of the pump cell;
calculate a deterioration rate of the sensor cell based on a slope of an output of the sensor cell with respect to time during a transient change in the output of the sensor cell according to the switch of the applied voltage and based on a variation of current in an output of the pump cell according to the switch of the applied voltage; and
determine a degree of deterioration of the sensor cell based on the calculated deterioration rate of the sensor cell;
after switching the applied voltage, detect outputs of the sensor cell at two arbitrary timings within a predetermined period before the output of the sensor cell is stabilized as a start point and an end point; wherein
a slope of a line segment connecting the start point and the end point is calculated as the slope during the transient change in the output of the sensor cell.

2. The system according to claim 1, wherein,
the switch of the applied voltage includes reducing the applied voltage of the pump cell stepwisely to a predetermined value.

3. The system according to claim 1, wherein,
the computer system is further programmed to calculate the deterioration rate of the sensor cell based on a ratio between the slope during transient change in the output of the sensor cell according to the switch of the applied voltage and an initial value of the slope.

4. The system according to claim 3, wherein,
the computer system is further programmed to calculate the slope during the transient change in the output of the sensor cell according to the switch in the applied voltage;
the calculated slope is normalized by dividing the calculated slope by an amount of the variation of current in the output of the pump cell accompanying the switch of the applied voltage; and
the deterioration rate of the sensor cell is calculated based on a ratio between the normalized slope and an initial value of the normalized slope.

5. The system according to claim 1, wherein,
the start point includes the output of the sensor cell at any one of a point when it becomes a tailing lowest point of the pump cell output current generated according to the switch of the applied voltage, a point when the first predetermined time has elapsed after the switch of the applied voltage, or a point when reaching a first predetermined percentage of the initial value of the output fluctuation amount of the sensor cell generated according to the switch of the pump cell applied voltage; and
the end point includes the output of the sensor cell at any one of a point when the second predetermined time has elapsed after the switch of the applied voltage, or a point when reaching a second predetermined percentage of the initial value of the output fluctuation amount of the sensor cell generated according to the switch of the applied voltage.

6. The system according to claim 1, wherein,
the computer system is further programmed to calculate the start point and the end point by averaging outputs of a plurality of sensor cells in a predetermined start point period including the start point and a predetermined end point period including the end point, and calculate the slope using the calculated start point and the end point.

7. The system according to claim 1, wherein,
the switch of the applied voltage is performed for a plurality of times;
the computer system is further programmed to calculate the slope during the transient change in the output of the sensor cell for a plurality of times according to the number of times the applied voltage is switched; and
the computer system is further programmed to calculate the deterioration rate of the sensor cell based on a plurality of calculated slopes.

8. The system according to claim 7, wherein,
the computer system is further programmed to calculate a deterioration rate of the sensor cell based on an average value obtained by averaging a part or all of the plurality of slopes.

9. The system according to claim 1, wherein,
the gas sensor is installed in an exhaust system of an internal combustion engine and is configured to detect a concentration of a specific gas component from the exhaust gas of the internal combustion engine;
the applied voltage is switched in a predetermined operating environment of the internal combustion engine in which an amount of the exhaust gas is stable, and the deterioration rate is calculated.

10. The system according to claim 9, wherein,
a predetermined driving environment includes the time when an ignition is off.

11. The system according to claim 9, wherein,
the predetermined operating environment includes the time when the internal combustion engine is stopped;
the applied voltage is switched by stopping application of the applied voltage to the pump cell when the internal combustion engine is stopped.

12. The system according to claim 9, wherein,
a switching of the applied voltage is performed for a plurality of times in a single period in which the internal combustion engine continuously satisfies the predetermined driving environment;
the computer system is further programmed to calculate the slope during the transient change in the output of the sensor cell according to the plurality of times of the switch of the applied voltage; and
the deterioration rate of the sensor cell is calculated based on the plurality of calculated slopes.

13. The system according to claim 9, wherein,
the computer system is further programmed to calculate the slope during the transient change in the output of the sensor cell according to the switch of the applied voltage; and
the deterioration rate of the sensor cell is calculated based on the calculated slope and a past value of a slope calculated under the same operating environment in the past.

14. The system according to claim 1, wherein,
the gas sensor includes a monitor cell for detecting the oxygen concentration adjusted by the pump cell.

15. The system according to claim 1, wherein,
the gas sensor includes a measurement chamber into which the detected gas is introduced; and
the pump cell and the sensor cell are disposed in the measurement chamber.

16. The system according to claim 1, wherein,
the gas sensor is configured to learn a correction amount of the output of the sensor cell based on the calculated deterioration rate.

17. The system according to claim 1, wherein,
the computer system is further programmed to determine an abnormality due to deterioration of emission based on the calculated deterioration rate.

18. The system according to claim 1, wherein
the computer system is further programmed to calculate a normalized slope by normalizing the slope of the output of the sensor cell with respect to time by the variation of current in the output of the pump cell, and calculate the deterioration rate of the sensor cell based on the normalized slope.

19. The system according to claim 1, wherein
the computer system is further programmed to calculate a normalized slope by normalizing the slope of the output of the sensor cell with respect to time by dividing the slope of the output of the sensor cell with respect to time by the variation of current in the output of the pump cell, and calculate the deterioration rate of the sensor cell based on the normalized slope.

20. A system comprising:
a gas sensor including:
    a pump cell for adjusting an oxygen concentration of a detected gas according to an applied voltage; and
    a sensor cell for detecting a concentration of a specific gas component from the detected gas after the oxygen concentration has been adjusted by the pump cell; and
a computer system, including memory storing instructions and at least one computer processor for executing the instructions such that the computer system is programmed to:
    switch an applied voltage of the pump cell;
    calculate a deterioration rate of the sensor cell based on a slope of an output of the sensor cell with respect to time during a transient change in the output of the sensor cell according to the switch of the applied voltage and based on a variation of current in an output of the pump cell according to the switch of the applied voltage; and
    determine a degree of deterioration of the sensor cell based on the calculated deterioration rate of the sensor cell; wherein
the gas sensor is installed in an exhaust system of an internal combustion engine and is configured to detect a concentration of a specific gas component from the exhaust gas of the internal combustion engine;
the applied voltage is switched in a predetermined operating environment of the internal combustion engine in which an amount of the exhaust gas is stable, and the deterioration rate is calculated; and
a predetermined driving environment includes the time when an ignition is off.

* * * * *